United States Patent
Reynolds et al.

(10) Patent No.: US 12,297,759 B2
(45) Date of Patent: *May 13, 2025

(54) SYSTEM AND METHOD FOR MOBILE CARBON CAPTURE

(71) Applicant: Echeneidae Inc., Livonia, MI (US)

(72) Inventors: Christina Reynolds, Livonia, MI (US); Eric Harding, Livonia, MI (US); Paul Gross, New Haven, CT (US)

(73) Assignee: ECHENEIDAE INC., Livonia, MI (US)

( * ) Notice: Subject to any disclaimer, the term of this patent is extended or adjusted under 35 U.S.C. 154(b) by 195 days.

This patent is subject to a terminal disclaimer.

(21) Appl. No.: 18/153,645

(22) Filed: Jan. 12, 2023

(65) Prior Publication Data

US 2023/0167756 A1  Jun. 1, 2023

Related U.S. Application Data

(63) Continuation of application No. 17/683,832, filed on Mar. 1, 2022, now Pat. No. 11,560,817.

(60) Provisional application No. 63/156,761, filed on Mar. 4, 2021.

(51) Int. Cl.
*F01N 3/08* (2006.01)
*F01N 3/00* (2006.01)

(52) U.S. Cl.
CPC .......... *F01N 3/0857* (2013.01); *F01N 3/005* (2013.01); *F01N 3/0885* (2013.01); *F01N 2260/04* (2013.01); *F01N 2370/24* (2013.01); *F01N 2570/10* (2013.01)

(58) Field of Classification Search
CPC ............... F01N 3/0857; F01N 2370/24; F01N 2570/10; F01N 2240/26; F01N 3/0871; F01N 3/0878; B01D 53/261; B01D 2253/108; B01D 2257/504; B01D 53/62
See application file for complete search history.

(56) References Cited

U.S. PATENT DOCUMENTS

| | | | |
|---|---|---|---|
| 3,613,256 | A | 10/1971 | Ovseevich et al. |
| 4,899,895 | A | 2/1990 | Espasandin et al. |
| 5,298,226 | A | 3/1994 | Nowobilski |
| 5,298,231 | A | 3/1994 | Rockenfeller |
| 5,362,022 | A | 11/1994 | Mcloughlin et al. |

(Continued)

FOREIGN PATENT DOCUMENTS

GB    2527608 A    12/2015

OTHER PUBLICATIONS

International Searching Authority "International Search Report and Written Opinion" From Application No. PCT/US2022/018305, Mailed May 18, 2022, pp. 6.

(Continued)

*Primary Examiner* — Matthew T Largi
(74) *Attorney, Agent, or Firm* — Fredrikson & Byron, P.A.

(57) ABSTRACT

A system for mobile carbon capture, preferably including a capture module, a regeneration module, and a storage module 130. The system can optionally include a thermal control module and/or a dehumidifier. A method for mobile carbon capture, preferably including adsorbing a target species, desorbing the target species, and storing the target species. The method can optionally include pre-treating input gas, offloading stored species, and/or regenerating desiccants.

13 Claims, 15 Drawing Sheets

(56) References Cited

U.S. PATENT DOCUMENTS

| | | | |
|---|---|---|---|
| 6,086,659 A | 7/2000 | Tentarelli | |
| 6,280,508 B1 | 8/2001 | Garrett et al. | |
| 7,621,980 B2 * | 11/2009 | Saito | B01D 53/62 |
| | | | 95/139 |
| 8,191,848 B2 | 6/2012 | Mcloughlin et al. | |
| 8,591,627 B2 | 11/2013 | Jain | |
| 8,807,256 B2 | 8/2014 | Gibb et al. | |
| 9,499,105 B1 | 11/2016 | Long | |
| 9,656,759 B2 | 5/2017 | De La Fuente Carnero et al. | |
| 10,279,306 B2 | 5/2019 | Gebald et al. | |
| 10,894,230 B2 * | 1/2021 | Sugiyama | B01D 53/229 |
| 11,035,280 B2 * | 6/2021 | Fujihara | F01N 3/0857 |
| 11,560,817 B2 * | 1/2023 | Reynolds | B01D 53/261 |
| 2003/0190509 A1 | 10/2003 | Byron, Jr. et al. | |
| 2004/0011198 A1 * | 1/2004 | Keefer | B01D 53/06 |
| | | | 96/125 |
| 2005/0061301 A1 | 3/2005 | Meiller et al. | |
| 2007/0125235 A1 | 6/2007 | Begley et al. | |
| 2008/0202339 A1 * | 8/2008 | Nalette | B01D 53/0476 |
| | | | 95/120 |
| 2009/0056827 A1 | 3/2009 | Tschantz | |
| 2009/0151560 A1 | 6/2009 | Adams et al. | |
| 2009/0211448 A1 | 8/2009 | Mcclain | |
| 2009/0275120 A1 * | 11/2009 | Koch | C12M 41/18 |
| | | | 435/292.1 |
| 2010/0196234 A1 | 8/2010 | Hammer et al. | |
| 2010/0251887 A1 | 10/2010 | Jain | |
| 2011/0088549 A1 * | 4/2011 | Sayari | B01J 20/28083 |
| | | | 95/95 |
| 2011/0167798 A1 * | 7/2011 | Evans-Beauchamp | F01N 5/04 |
| | | | 60/274 |
| 2011/0206581 A1 | 8/2011 | Ackley et al. | |
| 2013/0205998 A1 | 8/2013 | Dressler | |
| 2013/0298532 A1 * | 11/2013 | Hamad | B01D 53/62 |
| | | | 60/274 |
| 2013/0334269 A1 | 12/2013 | Cardonna et al. | |
| 2014/0099245 A1 | 4/2014 | Hamad | |
| 2014/0165569 A1 | 6/2014 | Hsu | |
| 2015/0360172 A1 | 12/2015 | Deptala | |
| 2017/0248051 A1 * | 8/2017 | Eddaoudi | F01N 3/0857 |
| 2019/0209961 A1 * | 7/2019 | Kennedy | B01D 53/0438 |
| 2019/0255941 A1 | 8/2019 | Gibb et al. | |
| 2020/0009504 A1 | 1/2020 | Eisenberger | |
| 2020/0032690 A1 | 1/2020 | Hengst et al. | |
| 2020/0346162 A1 | 11/2020 | Fowler et al. | |
| 2021/0016220 A1 | 1/2021 | Elliott et al. | |
| 2021/0253456 A1 | 8/2021 | Johnson | |
| 2022/0010707 A1 | 1/2022 | Sharma et al. | |
| 2023/0015857 A1 | 1/2023 | Miller et al. | |
| 2023/0027070 A1 | 1/2023 | Malik et al. | |

OTHER PUBLICATIONS

European Patent Office, "Extended European Search Report" From Application No. 22763886.3, Dated Oct. 17, 2024, pp. 6.

Reynolds, Christina, "Decarbonizing Freight Transport: Mobile Carbon Capture from Heavy-Duty Vehicles", A dissertation submitted in partial fulfillment of the requirements for the degree of Doctor of Philosophy (Environmental Engineering) in the University of Michigan 2019.

Sharma, Shivom, et al., "Carbon Dioxide Capture From Internal Combustion Engine Exhaust Using Temperature Swing Adsorption", Frontiers in Energy Research, Dec. 2019, vol. 7, Article 143.

Gross, Paul, "Carbon Capture for Semi Trucks, Launch HN: Remora (YC W21)", Hacker News, Mar. 10, 2021.

* cited by examiner

SYSTEM AND METHOD FOR MOBILE CARBON CAPTURE

CROSS-REFERENCE TO RELATED APPLICATIONS

This application is a continuation of U.S. application Ser. No. 17/683,832, filed on Mar. 1, 2022, which claims the benefit of U.S. Provisional Application Ser. No. 63/156,761, filed on 4 Mar. 2021, each of which is incorporated herein in its entirety by this reference.

TECHNICAL FIELD

This invention relates generally to the carbon capture field, and more specifically to a new and useful system and method for mobile carbon capture.

BACKGROUND

Many typical systems and/or methods for carbon capture rely on high pressures, heavy equipment, and/or cycles over large temperature and/or pressure ranges. Thus, there is a need in the carbon capture field to create a new and useful system and method for mobile carbon capture.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
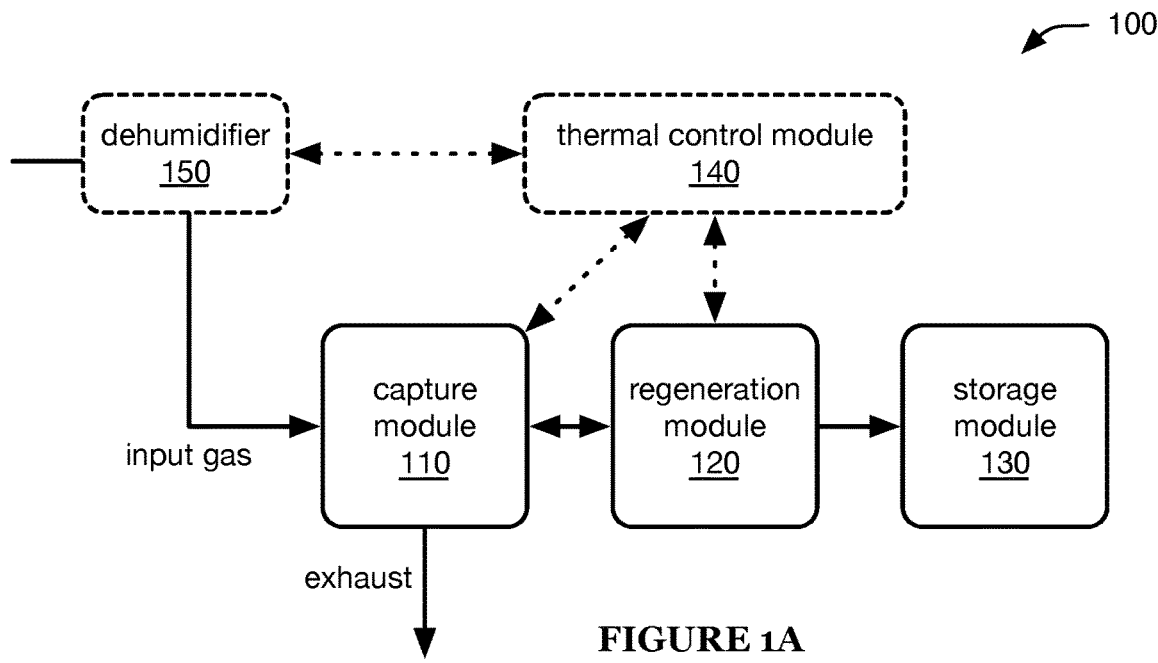
FIG. 1A is a schematic representation of an embodiment of a system for mobile carbon capture.
Figure 1B:
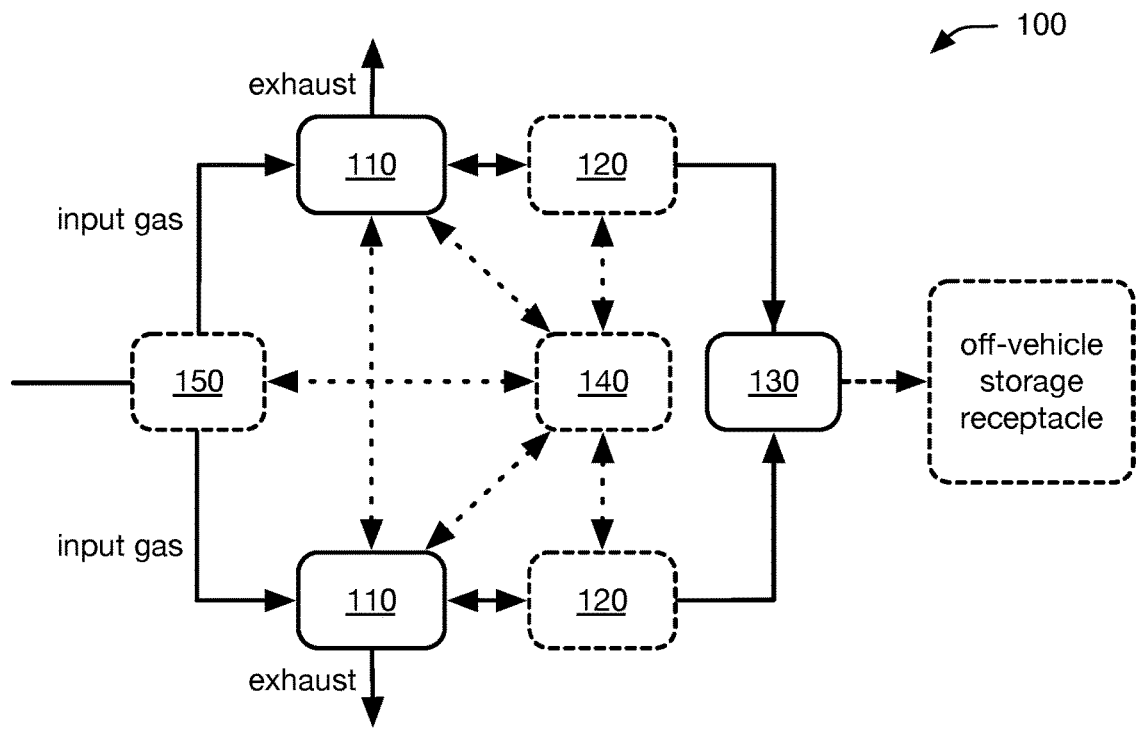
FIGS. 1B-1C are schematic representations of a first and second example, respectively, of the system.

A system 100 for mobile carbon capture preferably includes one or more: capture modules 110, regeneration modules 120, and storage modules 130 (e.g., as shown in FIGS. 1A-1B). The system 100 can optionally include one or more thermal control modules 140 and/or dehumidifiers 150. Further, the system can additionally or alternatively include any other suitable elements. The system 100 is preferably configured to perform the method 200, but can additionally or alternatively have any other suitable function(s).

Figure 2A:
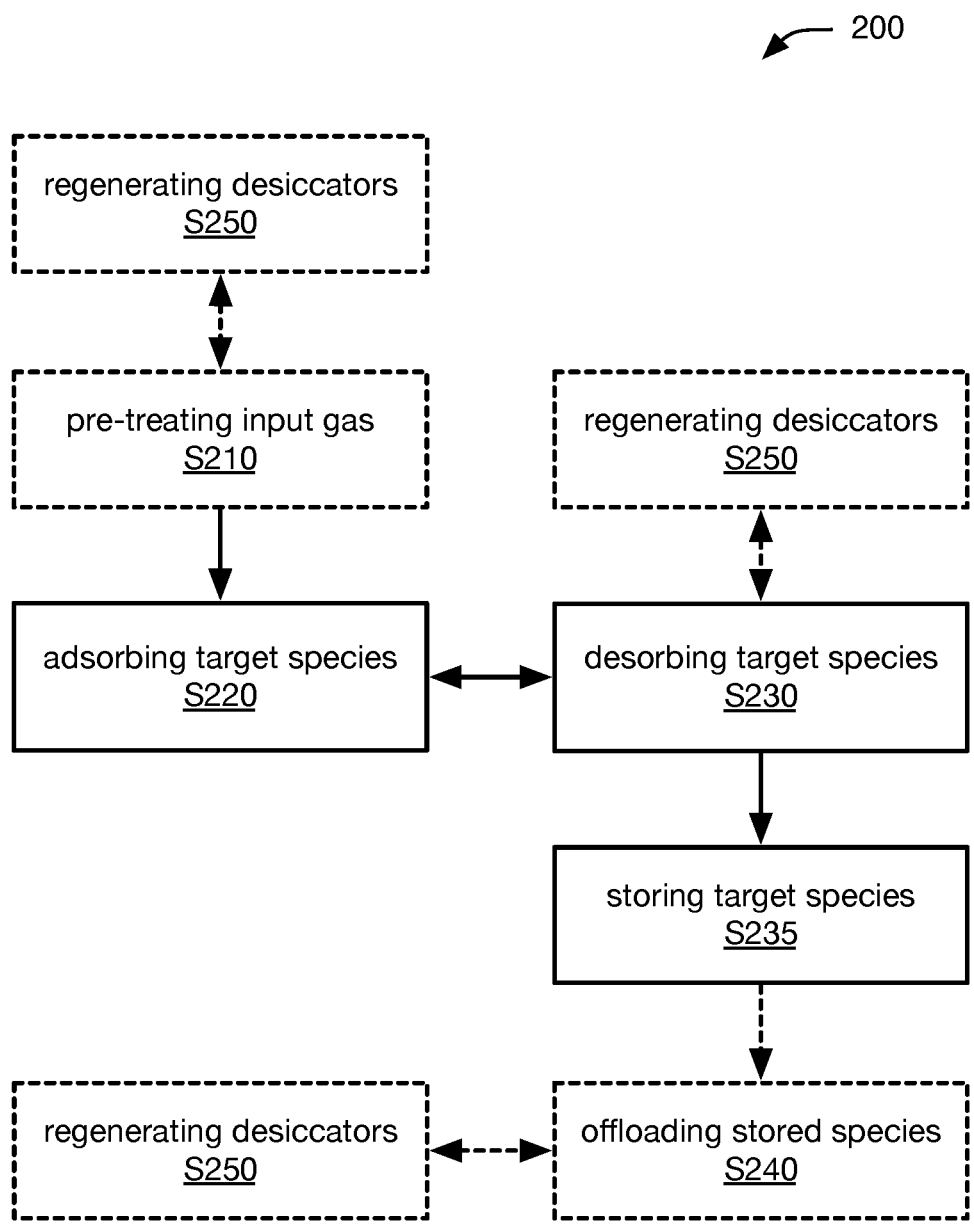
FIG. 2A is a schematic representation of an embodiment of a method for mobile carbon capture.

A method 200 for mobile carbon capture preferably includes: adsorbing a target species S220, desorbing the target species S230, and storing the target species S235 (e.g., as shown in FIG. 2A). The method 200 can optionally include pre-treating input gas S210, offloading stored species S240, regenerating desiccators S250, and/or any other suitable elements. The method 200 is preferably performed using the system 100, but can additionally or alternatively be performed using any other suitable systems. In some embodiments, the method 200 can include using some or all of the functionality described regarding one or more of the elements of the system 100; accordingly, where the system or an element thereof is described as being configured to, being operable to, and/or functioning to perform a task, the method can optionally include performing that task (e.g., using that element of the system and/or using any other suitable elements).

2. Technical Advantages

Variants of the technology can confer one or more advantages over conventional technologies. In some examples, these advantages can facilitate carbon capture in a mobile setting, such as at a moving vehicle.

First, variants of the technology can enable and/or facilitate continuous capture of carbon dioxide from an input gas over long timescales. For example, the use of multiple capture modules can enable continuous capture of carbon dioxide ($CO_2$) from an input gas (e.g., from vehicle exhaust gasses) over timescales much longer than the capture-regeneration cycle time for one such module, as regeneration of one module can be performed while carbon capture is performed by another module.

Second, variants of the technology can enable and/or facilitate energy-efficient $CO_2$ adsorption-desorption cycles. For example, these cycles can be powered in part or full by waste heat (e.g., heat of the exhaust from which $CO_2$ is to be captured, heat of the vehicle engine, etc.). Additionally or alternatively, the technology can employ ambient pressure (or substantially ambient, such as approximately 1 atmosphere) adsorption conditions and/or low-temperature desorption conditions, such as by using solid porous capture media (e.g., zeolite beads and/or pellets). Additionally or alternatively, the technology can employ low-pressure (e.g., 1-3 atmospheres) adsorption conditions, such as by using liquid capture media. Such conditions may reduce the energy needed to perform the adsorption-desorption cycles, which may enable the use of waste heat in some examples.

Third, variants of the technology can enable and/or facilitate the use of a low-weight carbon capture system, which can reduce the additional energy needed from the vehicle to transport the capture system. For example, the use of multiple capture modules, such as described above, can facilitate the use of smaller-size capture modules (e.g., as compared with a capture module sized to continuously adsorb $CO_2$ without regeneration during a vehicle trip, such as wherein capture module regeneration is performed once the vehicle trip has ended, such as while the vehicle is stationary and connected to an external power source and/or regeneration module), and/or the use of ambient pressure conditions can facilitate the use of lower-strength capture modules (e.g., as compared with high-pressure vessels used for carbon capture by MOFs and the like).

Fourth, variants of the technology can enable and/or facilitate capture of a large fraction of the total carbon dioxide present in combustion exhaust (e.g., diesel engine exhaust). For example, variants of the technology can function to capture greater than 50%, 60%, 70%, 75%, 80%, 85%, 90%, 95%, 97%, 98%, and/or 99% of the carbon dioxide present in the exhaust. Additionally or alternatively, in some variants, the carbon dioxide can be captured and stored at high purity, such as greater than 50%, 60%, 70%, 75%, 80%, 85%, 90%, 95%, 97%, 98%, and/or 99% pure.

However, further advantages can additionally or alternatively be conferred by the system and/or method described herein.

3. System

The system preferably functions to capture and store a target species (e.g., carbon dioxide) from an input fluid, preferably an input gas (e.g., a fluid containing combustion products, such as diesel engine exhaust and/or other combustion engine exhaust).

The system is preferably configured to release the input gas (e.g., target species-depleted input gas, from which some, all, or substantially all of the target species has been removed) at a gas exhaust (e.g., "output" or "output manifold"), more preferably venting the gas (e.g., $CO_2$-depleted exhaust having a lower concentration of $CO_2$ than the input gas) to atmosphere. A person of skill in the art will recognize that, in this context, 'target species-depleted' (e.g., $CO_2$-depleted) does not necessarily mean that the target species has been removed entirely, but rather only that at least some of the target species has been removed, thereby depleting the gas of the target species and making it a target species-depleted gas.

The system is preferably used with and/or connected to (e.g., mounted to, fluidly coupled to an exhaust system of, etc.) a vehicle (e.g., combustion engine-powered vehicle, from which the input fluid can be received), preferably a road vehicle but additionally or alternatively any other suitable vehicle. For example, the system can include and/or be used with (e.g., mounted to) a vehicle such as a Class 8 tractor (or semi-truck) or combination tractor-trailer, preferably wherein the vehicle includes an internal combustion engine such as a diesel engine (e.g., from which the input fluid can be received). The system can be configured to connect to one or more exhaust ports of the vehicle (e.g., exhaust manifold, turbo outlet, exhaust emission device outlet, etc.), such as wherein the exhaust port(s) are connected to the gas input of the system (e.g., intake/intake manifold of the system 100, etc.), and/or to the tractor frame (e.g., between the rear of the cab and the fifth wheel), but can additionally or alternatively be configured to connect to any other suitable portions of the vehicle gas handling elements (e.g., connected to any vehicle port, pipe, and/or manifold that contains combustion products, such as any location downstream of the engine cylinders), and/or can be otherwise suitably configured. However, the system can alternatively be utilized in any other suitable mobile and/or stationary applications (e.g., used with and/or connected to a stationary combustion engine, such as a fuel-powered generator), can be connected to any other suitable objects (or no such objects), and/or can be otherwise used.

The system preferably includes multiple capture modules 110, which can function to enable continuous capture of the target species, such as wherein one capture module performs target species capture (e.g., adsorbs $CO_2$) while another capture module is regenerating (e.g., desorbing $CO_2$). In some embodiments, all capture modules of the system share a regeneration module, storage module, and/or thermal control module. However, the system can alternatively include a separate regeneration module, storage module, and/or thermal control module for each capture module, for each pair of capture modules (e.g., wherein one capture module of each pair performs target species capture while the other capture module of each pair is regenerating), or can include any suitable number of each such module.

3.1 Capture Module

Figure 3A:
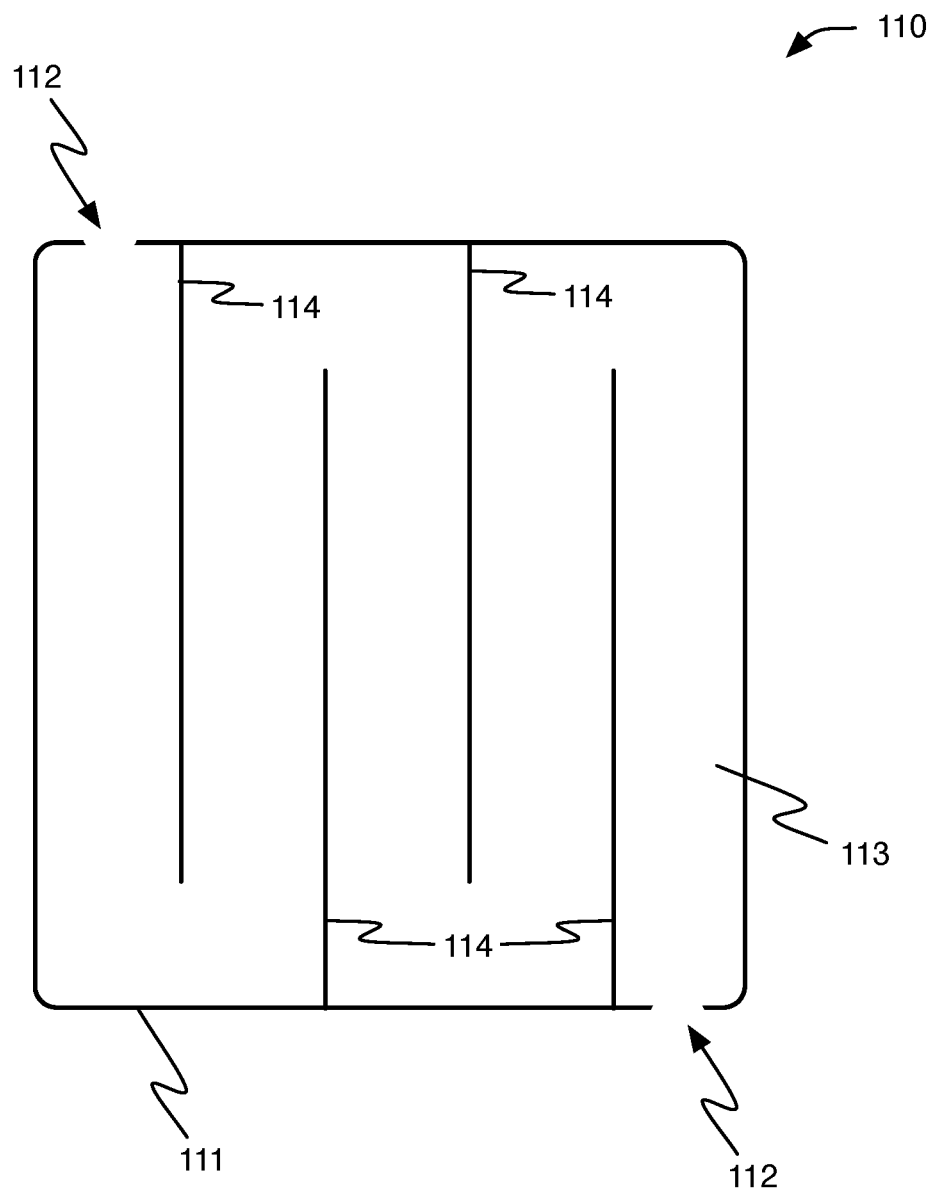
FIGS. 3A-3B are schematic representations of a first and second example, respectively, of a capture module of the system.
Figure 3B:
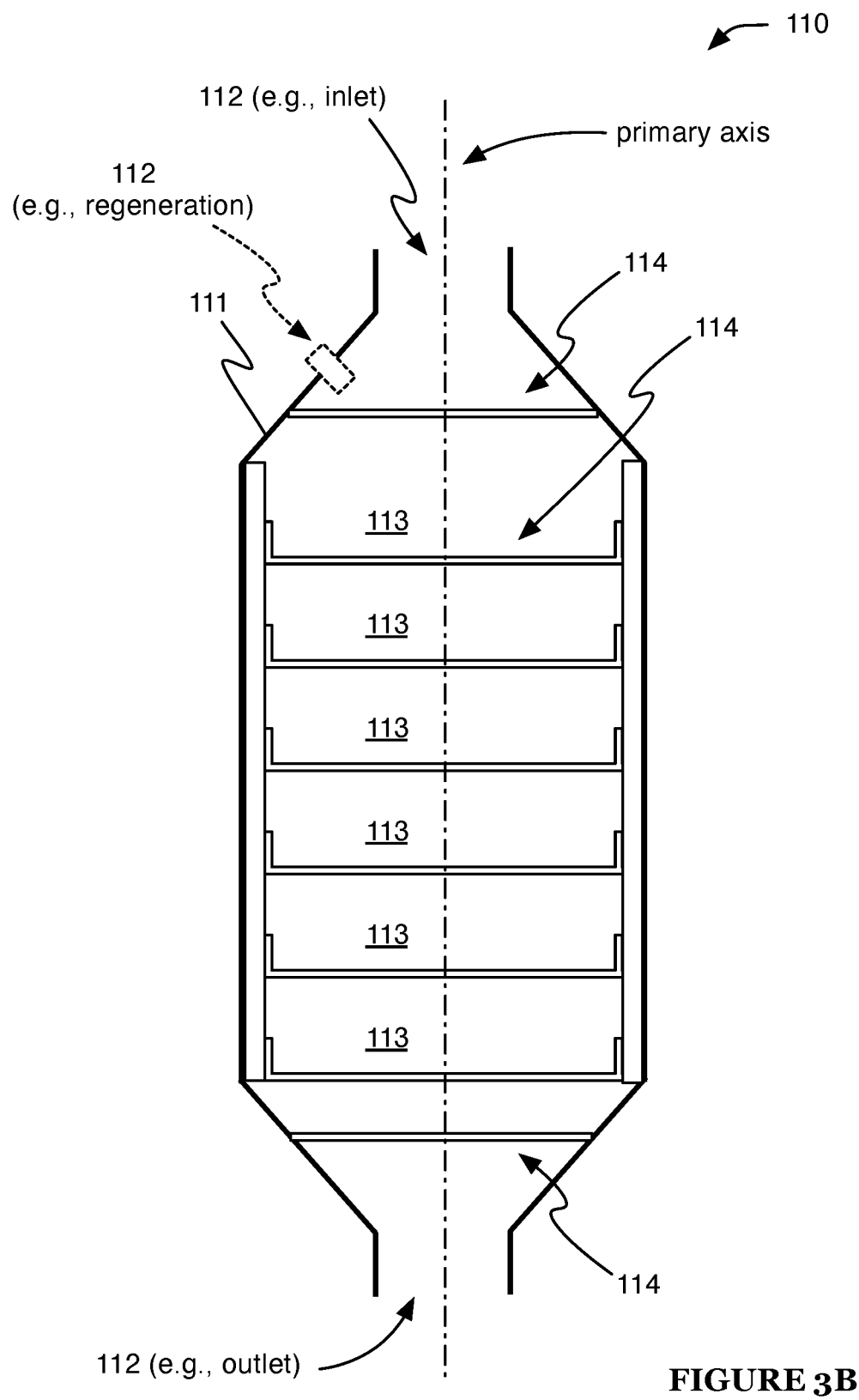

The capture module 110 preferably functions to capture the target species (e.g., carbon dioxide) from the input fluid. The capture module 110 preferably includes a housing 111, one or more fluid ports 112 (e.g., inlets, outlets, bidirectional ports, etc.), and/or a capture medium 113 (e.g., as shown in FIGS. 3A-3B). The capture module can optionally include one or more flow modification elements 114 and/or any other suitable elements.

The housing 111 (e.g., "chamber" or "capture chamber") preferably functions to contain the other elements of the capture module and to contain gases (e.g., input gas, regeneration gas, etc.) and/or other fluids within the capture module (e.g., in fluidic contact with the capture medium). The housing preferably defines a housing interior, in which other elements of the capture module (e.g., the capture medium, flow modification elements, etc.) are preferably contained. The housing is preferably substantially fluid impermeable (e.g., except through the fluid ports 112) but can additionally or alternatively have any other suitable properties.

The fluid ports 112 preferably function to enable fluid flow into and/or out of the housing. The capture module preferably includes one or more ports 112 defined in the housing. Each port can be an inlet, an outlet, a bidirectional fluid port, and/or can be operable to switch between such functionalities (e.g., acting as an inlet during capture and as an outlet during regeneration) and/or any other suitable functionalities. The ports (and/or gas flow elements, such as pipes and/or manifolds connected to the ports) can optionally include (or be fluidly coupled to) one or more valves (e.g., control valves, check valves, etc.) to control such flow. The set of fluid ports are preferably operable to fluidly couple the housing interior to a gas input (e.g., from a combustion engine, preferably received via one or more exhaust ports of the engine and/or vehicle powered by the engine, such as a vehicle exhaust manifold, turbo outlet, exhaust emission device outlet, and/or any other suitable port, pipe, and/or manifold that contains combustion products, such as any location downstream of the engine cylinders, etc.) and a gas exhaust (e.g., provided to an exhaust stack or tailpipe, venting to atmosphere, etc.), and optionally to a regeneration module. In some examples, one or more valves (e.g., as described above) can control such fluidic couplings. In some examples, the valves (and/or any other valves of the system) can include high-performance butterfly valves configured to tolerate elevated temperatures, pressure differentials, and/or vacuum levels, such as those present within the system (e.g., at the capture module).

Figure 4A:
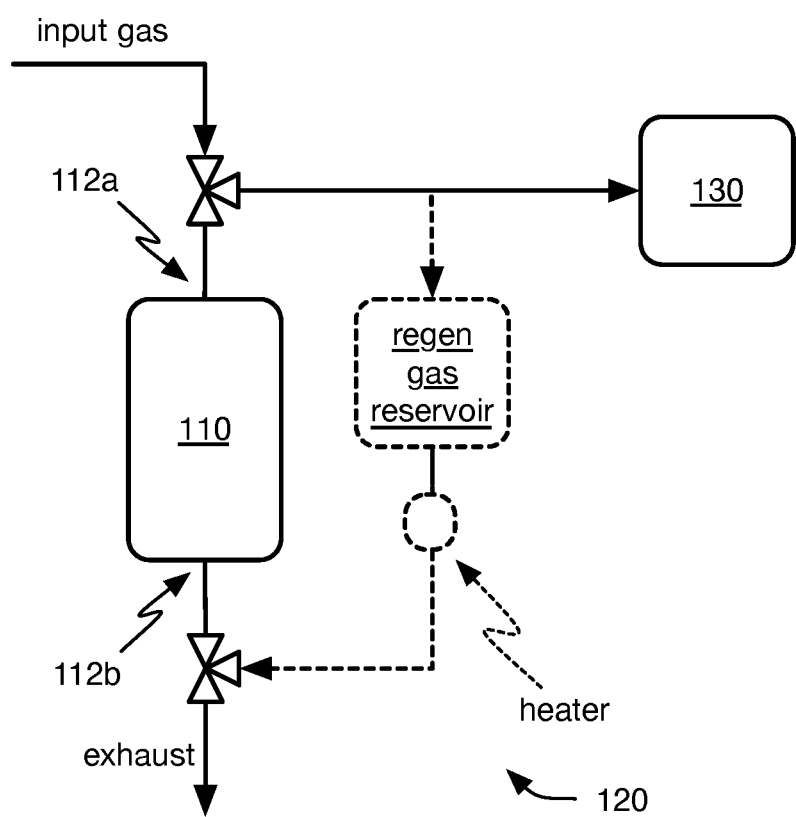
FIGS. 4A-4B are schematic representations of a first and second example, respectively, of a portion of the system.
Figure 4B:
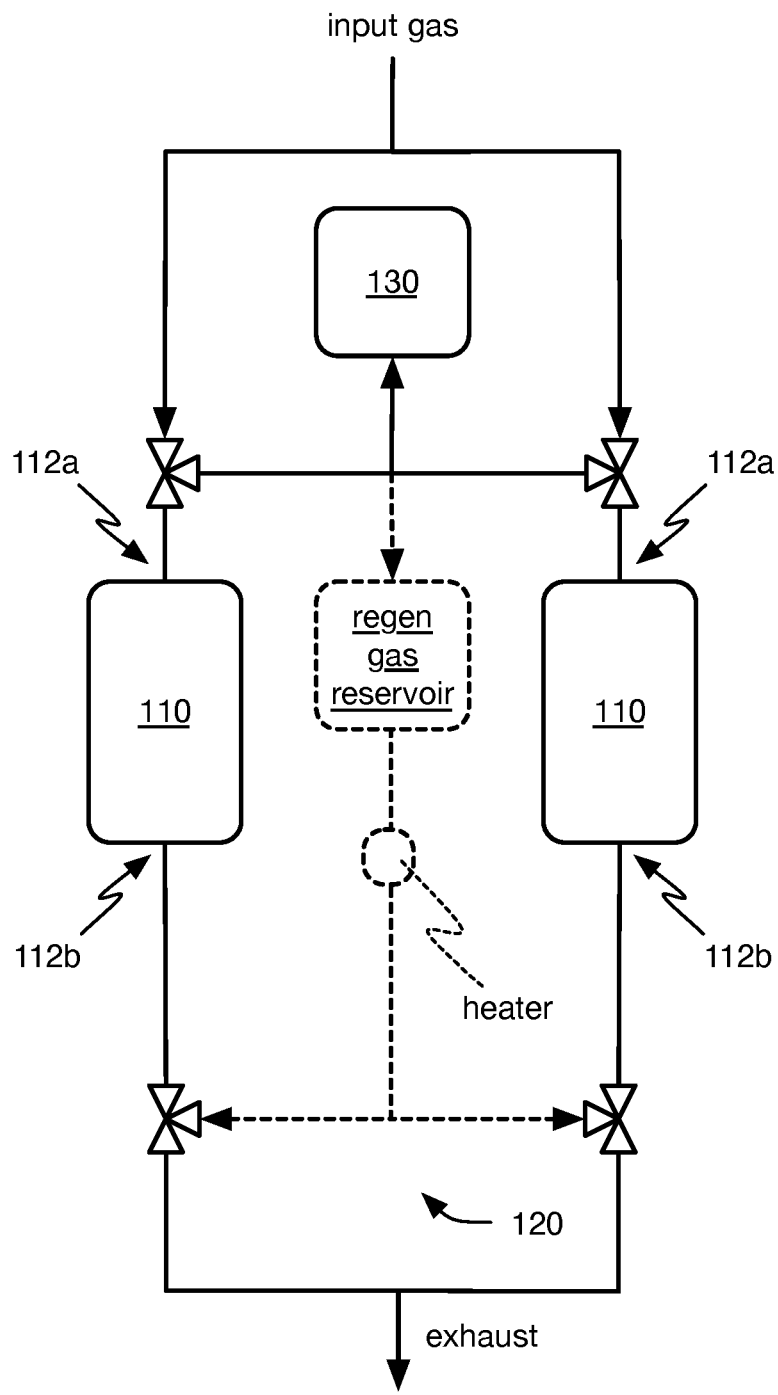
Figure 5A:
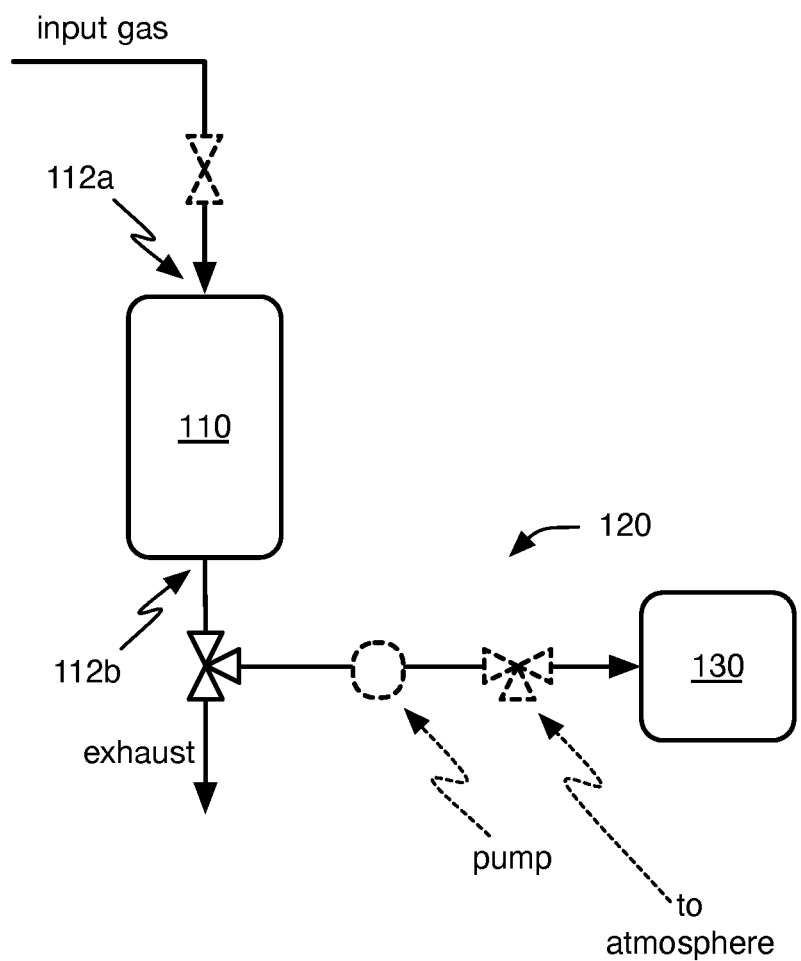
FIGS. 5A-5B are schematic representations of a third and fourth example, respectively, of a portion of the system.
Figure 5B:
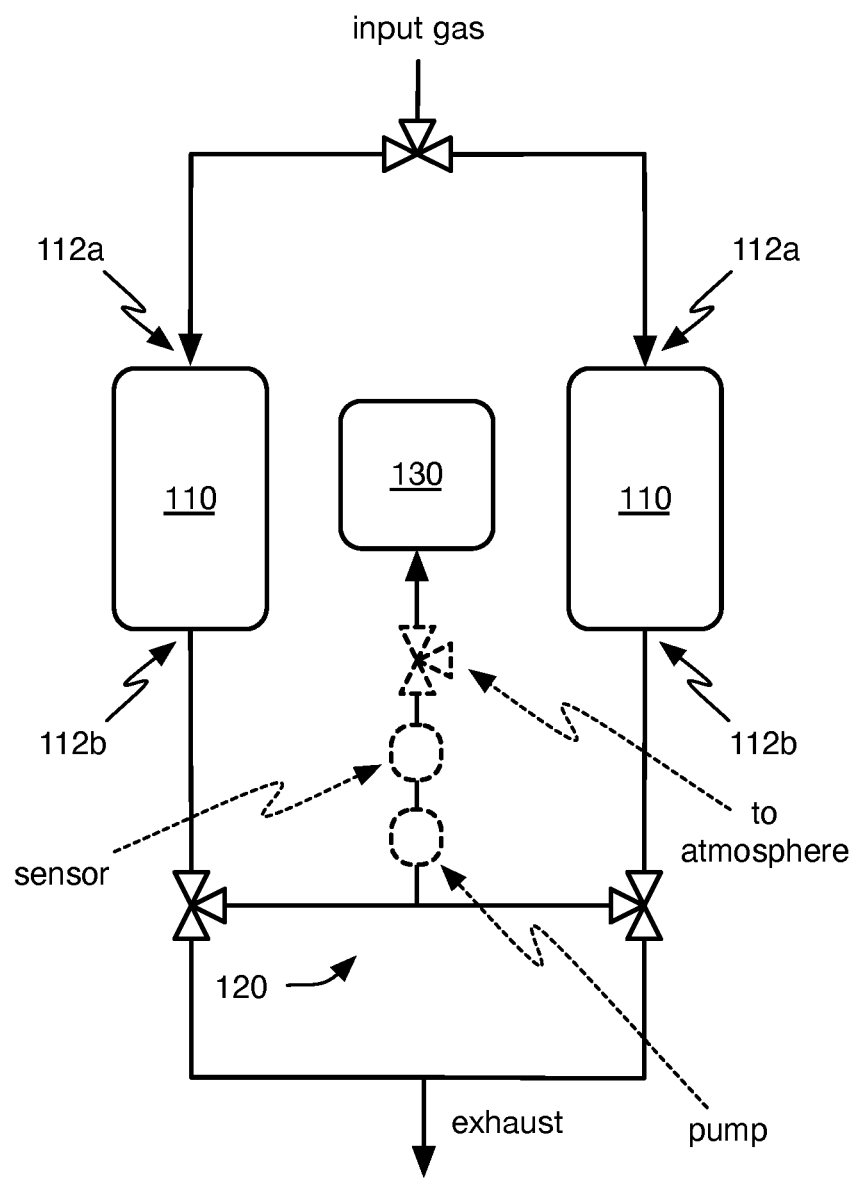

In some embodiments, such as shown by way of examples in FIGS. 4A-4B, the capture module includes a first port 112*a* and a second port 112*b*. During capture, the first port 112*a* is preferably operable to function as an input gas inlet for the capture module (e.g., wherein the first port 112*a* is connected to the gas input), and the second port 112*b* is preferably operable to function as an input gas outlet for the capture module (e.g., wherein the second port 112*b* is connected to the gas exhaust). In some examples, during regeneration, the first port 112*a* is operable to function as a regeneration outlet (e.g., wherein the first port 112*a* is connected to the storage module 130). In other examples, during regeneration, the second port 112*b* is operable to function as a regeneration outlet (e.g., wherein the second port 112*b* is connected to the storage module 130. In some such examples in which a regeneration gas reservoir is used, the regeneration outlet can also be connected to an inlet of the reservoir (e.g., configured to return regeneration gas to the reservoir) and/or the other port (e.g., the second port 112*b*, if the first port 112*a* is the regeneration outlet; the first port 112*a*, if the second port 112*b* is the regeneration outlet) can function as a regeneration inlet and/or be connected to an outlet of the reservoir (e.g., configured to receive regeneration gas from the reservoir).

However, the capture module can additionally or alternatively include any other suitable fluid ports 112 with any suitable functionalities.

The capture medium 113 (e.g., "adsorbent material(s)") preferably functions to adsorb one or more target species (e.g., carbon dioxide). The adsorption is preferably selective, such as wherein the target species is preferentially adsorbed in comparison with some or all other species in the input gas. Although described herein as adsorption, a person of skill in the art will recognize that the target species can additionally or alternatively be captured via absorption and/or any other suitable sorption processes.

The capture medium is preferably a solid material, such as one or more zeolite materials, but can additionally or alternatively include one or more metal-organic frameworks (MOFs), activated carbon, and/or any other suitable materials; in some examples, the capture medium includes one or more zeolite materials and does not include any MOFs.

The capture medium is preferably substantially porous, such as including porous zeolite beads and/or pellets. In variants, capture medium can include a bed (a.k.a. pelletized bed) formed by a plurality of aggregated beads, pellets, and/or other element geometries (e.g., spherical, ellipsoidal, cuboidal, etc.) of a solid adsorbent. The bed can be homogeneous (e.g., substantially similar materials and/or pellet geometries) or heterogeneous (e.g., elements can have mixed sizes, shapes, materials, etc.). Individual elements/particulates of an aggregate bed can have a characteristic length (e.g., diameter, pellet length, maximal dimension, etc.) of less than 1 mm, 1 mm, 2 mm, 3 mm, 4 mm, 5 mm, 6 mm, 8 mm, greater than 8 mm, within any suitable open or closed interval bounded by one or more of the aforementioned values, and/or any other suitable characteristic length. In a specific example, elements can be sized with a characteristic lengthscale (e.g., width, length, diameter, etc.) of about 3-5 mm. However, the capture medium can additionally or alternatively have any other suitable structure.

Many zeolite materials (and/or other capture media) are prone to adsorb water (e.g., wherein the materials will preferentially adsorb water rather than carbon dioxide and/or other target species; wherein water desorption occurs more slowly and/or requires higher temperatures than desorption of carbon dioxide and/or other target species; wherein target species adsorption must otherwise compete with water adsorption at the capture medium; etc.), and so the (past and/or concurrent) presence of water may prevent or slow carbon capture, and/or may reduce the carbon capture capacity of the materials. However, in some examples, the capture medium (e.g., porous solid medium, such as zeolite) can be water-resistant, such as by including a hydrophobic surface coating. Such water resistance can function to prevent or reduce water adsorption, thereby reducing or eliminating challenges associated with the presence of water in the input gas; in some examples, this may enable the omission or reduction in scale (e.g., reduced size, performance, water capacity, etc.) of the dehumidifier 150.

The capture medium can additionally or alternatively include liquid media and/or any other suitable media.

In some examples, the capture medium can include amines (e.g., added to a liquid medium and/or porous solid medium), which can function to increase storage capacity of the medium.

In some variants, the system can include more than one type of capture medium (e.g., wherein each capture module contains a single capture medium, and the capture media differ between capture modules; wherein one or more capture modules each contain multiple capture media; etc.). In examples, the system can include multiple zeolite materials; can include both zeolite(s) and one or more other solid media, such as activated carbon and/or MOFs; and/or can include both solid and liquid media.

However, the system can additionally or alternatively include any other suitable capture medium or combinations of capture media.

Figure 3C:
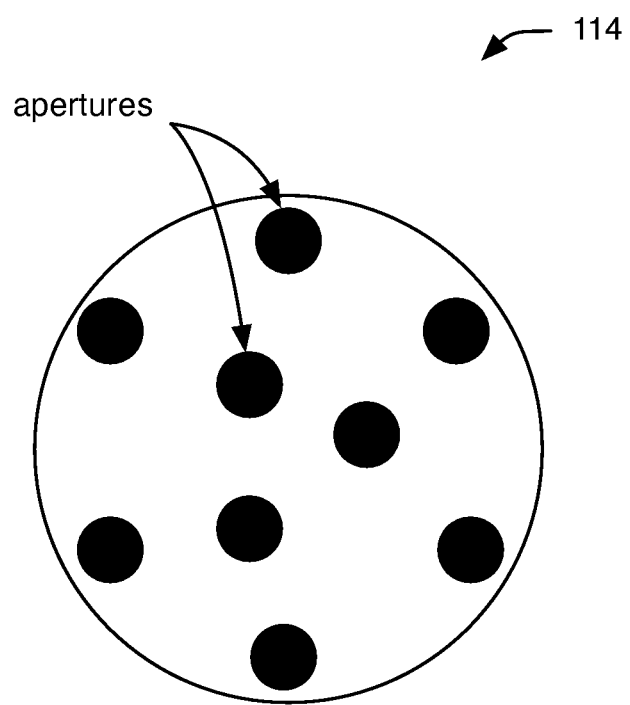
FIG. 3C is a schematic representation of a specific example of baffle of the system.

The capture module can optionally include one or more flow modification elements 114, such as baffles and/or spacers. The baffles can function to increase gas residence time within the capture module, to increase uniformity of gas flow through the capture module (e.g., uniformly distributed turbulent flow, uniform pressure loss, etc.), and/or otherwise promote increased and/or more uniform interaction between the gas and the capture medium. For example, baffles can be arranged to define a flow path of increased length through the capture module (e.g., circuitous, serpentine, boustrophedonic, and/or otherwise indirect flow path), such as shown by way of example in FIG. 3A. Additionally or alternatively, the baffles can include one or more apertures through which gas can flow (e.g., as shown in FIG. 3B), such as wherein the apertures extend across all or substantially all of the capture module (e.g., arranged substantially normal to a primary axis defined by the capture module, such as shown by way of example in FIG. 3C), but the apertures allow for flow through the capture module. The aperture patterns can be similar and/or uniform between different baffles (e.g., uniform or substantially uniform along the primary axis), or can be varied (e.g., such as proximal to the ends of the chamber and/or ports, where the flow is initially concentrated). Apertures can be circular, polygonal, and/or have any other arbitrary shape(s). However, the baffles can additionally or alternatively include any other suitable set of flow apertures with any other suitable geometry(ies). The spacers can function to increase interaction between one or more gases (e.g., input gas, regeneration gas, etc.) and the capture medium (e.g., by increasing the amount of capture medium surface area that is exposed to the gas). In examples, the spacers can include mesh spacers (e.g., metallic mesh, such as stainless steel mesh), foam spacers (e.g., cellulose foam), and/or any other suitable spacers arranged within the capture medium (e.g., intermixed with the capture medium, supporting intercalated capture medium particles, etc.).

However, the capture module 110 can additionally or alternatively include any other suitable elements in any suitable arrangement.

3.2 Regeneration Module

The regeneration module 120 preferably functions to release the adsorbed species from the capture medium and/or transport the released species to (or toward) the storage module, such as via a regeneration manifold operable to fluidly couple the capture medium and its surroundings (e.g., within the capture module housing) to the storage module. The regeneration module is preferably operable to output desorbed gas (e.g., the target species) to the storage module (e.g., conveyed via the regeneration manifold), and can additionally or alternatively be operable to vent desorbed gas to atmosphere and/or direct desorbed gas to any other suitable location(s).

In some embodiments, the regeneration module is operable to flow a regeneration fluid (e.g., gas) past the capture medium. The regeneration fluid is preferably the target species (or primarily contains the target species), but can additionally or alternatively include any other suitable fluid (preferably a substantially inert fluid or a fluid that is not substantially reactive with the target species and/or elements of the system). The regeneration module can include a regeneration fluid reservoir to provide such fluid.

In one embodiment, the regeneration module defines a regeneration gas flow loop which includes the capture module (e.g., flows into one port of the capture module and out another port of the capture module). After exiting the capture module, the gas in the loop can refill the regeneration fluid reservoir, can go back into the capture module, and/or can be taken off the loop (e.g., by a manifold, pump, compressor, etc.) to be provided to the storage module (e.g., as shown in FIGS. 4A-4B).

Additionally or alternatively, the regeneration module can be operable to apply a relative negative pressure (e.g., partial vacuum, such as less than 20, 20, 25, 26, 27, 28, 29, 29.5, 29.7, 29.8, and/or greater than 29.8 inHg relative negative pressure, within any suitable open or closed interval bounded by one or more of the aforementioned values, and/or any other suitable vacuum pressure) to the interior of the capture module (e.g., to the capture medium and its surroundings within the capture module housing). For example, the regeneration module can include a pump configured to partially evacuate the capture module housing and/or convey its gaseous contents (e.g., gasses contained within the housing, gasses desorbed from the capture medium, etc.) to the storage module 130 (and/or elsewhere, such as vented to atmosphere), preferably via the regeneration manifold.

In some embodiments, the regeneration module can be operable to be controlled between a vent mode and a storage mode, such as shown by way of examples in FIGS. 5A-5B, 7, and 8; for example, the regeneration module can include one or more valves configured to control whether the evacuated gas is fluidly coupled to the storage module or to atmosphere. In the vent mode, the gas evacuated from the capture module are preferably vented to atmosphere (and/or otherwise discarded), whereas in the storage mode, the evacuated gas is preferably stored in the storage module. For example, the regeneration module can be configured to operate in the vent mode during the start of a regeneration cycle (e.g., while the evacuated gas may contain a larger portion of undesired species, such as species other than the target species that are present in the input gas, which may have remained in the open volumes within the capture module), and then to switch to operation in the storage mode during a later time interval of the regeneration cycle (e.g., after the majority of undesired species have been cleared, and so the evacuated gas may contain a larger portion of the target species that desorbs from the capture medium during the regeneration process).

In some embodiments, the regeneration module can include one or more sensors (and/or be configured to receive information from one or more sensors, such as sensors located within other elements of the system, such as within the capture module, storage module, thermal control module, and/or dehumidifier), preferably sensors associated with gas properties. In examples, the sensors can include one or more pressure sensors, species concentration sensors (e.g., optical sensors such as IR sensors, paramagnetic sensors, thermal conductivity sensors, etc.; configured to determine absolute concentration, such as partial pressure, and/or relative concentration, such as fractional concentration of a species in the gas), and/or any other suitable sensors. For example, the regeneration module can include an IR sensor configured to determine (and/or sample information indicative of) $CO_2$ concentration and/or a paramagnetic (e.g., thermo-paramagnetic) sensor configured to determine (and/or sample information indicative of) $O_2$ concentration (either or both of which, in some variants, can optionally be used along with a pressure sensor to convert from partial pressure to relative concentration). In some such embodiments, the regeneration module can be operable to transition between the vent mode and the storage mode based on information sampled and/or determined by the sensors, such as described below in more detail regarding the method (e.g., regarding S235).

However, the regeneration module 120 can additionally or alternatively include any other suitable elements in any suitable arrangement.

3.3 Storage Module

The storage module 130 preferably functions to store the captured target species.

The target species (e.g., carbon dioxide) is preferably stored in a densified form. For example, the species can be stored as a compressed gas (e.g., at 30-100 bar, 30-50 bar, 45-75 bar, 70-100 bar, less than 30 bar, or greater than 100 bar, etc., preferably at or above 60 bar), can be stored as a liquid (e.g., pressurized carbon dioxide liquid at temperatures below the approximately 31.1° C. critical point of carbon dioxide, such as liquid carbon dioxide at pressures above 75 psi), can be stored as a solid (e.g., cooled carbon dioxide solid, such as carbon dioxide below −78.5° C.), and/or can be stored in any other densified form. However, the storage module can alternatively store the target species in a low-density form (e.g., uncompressed or lightly-compressed gas) and/or any other suitable form.

The storage module can include one or more tanks, vessels (e.g., pressure vessels), and/or any other suitable enclosures for storing the target species. The storage module (and/or subsets thereof, such as individual tanks or vessels, subsets of the total number of tanks or vessels, etc.) is preferably operable to be fluidly coupled to the regeneration module, thus enabling output of desorbed gas from the regeneration module to the storage module (e.g., such as described above regarding the regeneration module).

In some examples, such as those in which the target species is stored in a condensed phase (e.g., liquid, solid, etc.), the storage module can be operable to be (partially)

purged and/or vented (e.g., to atmosphere), such as in a manner controlled by one or more valves. In some examples in which the target species is stored in a condensed phase, undesired species (e.g., other species from the input gas) may remain in the gas phase; for example, under many conditions in which $CO_2$ forms a condensed phase (e.g., liquid at elevated pressure, solid at decreased temperature, etc.), other species in the combustion exhaust gas, such as $O_2$ and/or $N_2$, will remain gaseous. In such examples, by purging (e.g., with the target species in gas phase) and/or venting a volume of the storage module that contains the residual gasses (e.g., and not the condensed target species), some or all of the undesired species can be removed from the storage module, thereby increasing the purity of the target species stored in the storage module. Accordingly, the storage module can be configured to vent from a location bounding the volume within the storage module containing the gas phase species, such as from a location above the liquid target species (e.g., a location at or near the top of the enclosure).

However, the storage module 130 can additionally or alternatively include any other suitable elements in any suitable arrangement.

3.4 Thermal Control Module

The system can optionally include one or more thermal control modules 140. The thermal control module can function to control one or more temperatures within the system (e.g., temperatures of system elements, process gases, etc.).

In some embodiments, the thermal control module includes one or more heat exchangers, which can function to transfer heat between process fluids (e.g., input gas, regeneration gas, desorbed species, etc.) and/or elements of the system (e.g., capture modules and/or elements thereof, such as the capture medium, heat storage elements, dehumidifier, etc.). In a first example, a heat exchanger is operable to transfer heat between the input gas and one or more capture modules (e.g., capturing heat from the input gas and using it to heat a capture module). In a second example, a heat exchanger is operable to transfer heat between different capture modules (e.g., capturing heat from one capture module and using it to increase the temperature of the other capture module). In a third example, a heat exchanger is operable to transfer heat between a heat storage element and one or more other elements of the system and/or process fluids, such as by capturing heat from one or more elements of the system and/or process fluids and using it to heat the heat storage element, and then transferring heat from the heat storage element back to one or more elements of the system and/or process fluids (e.g., the same elements and/or fluids from which the heat was captured, and/or different elements and/or fluids). However, the thermal control module can additionally or alternatively include any other suitable heat exchangers.

The thermal control module can optionally include one or more heating elements, which can function to increase the temperature of process gases and/or elements of the system. The heating elements can include electrical heaters (e.g., resistive heaters, electrical heat pumps, etc.), combustion-based heaters, mechanical heat pumps, and/or any other suitable heaters. In examples, the thermal control module can include heaters thermally coupled to the capture medium (e.g., arranged proximal to the capture medium, such as arranged within the housing in, arranged in contact with the capture medium 113, arranged in contact with the housing 111, etc.), the regeneration module (e.g., configured to heat regeneration gas prior to its introduction to the capture module), and/or any other suitable elements of the system.

However, the system can additionally or alternatively include any other suitable thermal control elements in any suitable arrangement.

3.5 Dehumidifier

The system can optionally include one or more dehumidifiers 150, which can function to dehumidify (and, in some examples, to cool) the input gas. As described above, interaction of water with the capture medium can reduce its performance in adsorbing the target species (e.g., due to water adsorption competing with target species adsorption at the capture medium). Accordingly, the dehumidifier can remove (some or all) water from the input gas, which can function to alleviate the performance challenges associated with the presence of water.

The dehumidifier is preferably arranged between the input gas source and the capture module, but can alternatively be arranged within the capture module (e.g., inside the housing interior) and/or in any other suitable location.

In some embodiments, the dehumidifier can include a thermal condensation dehumidifier, which, in examples, can use the target species (e.g., carbon dioxide) and/or any other fluid as a working fluid. In examples in which the target species is used as a working fluid, fluid leaking from the closed loop refrigeration module (e.g., into the input gas stream and/or the capture module) may be recaptured in the course of normal system operation, thereby reducing the potential negative impacts of such leaks.

In some embodiments, the dehumidifier can include multiple stages configured to dehumidify, cool, and/or otherwise condition the input gas. In examples, the stages can include water condensation elements, water capture (e.g., water sorption, such as adsorption and/or absorption) elements such as desiccators, and/or any other suitable dehumidification elements.

In some embodiments, the dehumidifier can include one or more outlets configured to release water (e.g., condensate removed from the input gas) from the system and/or deliver water to a water storage element.

In some embodiments, the dehumidifier can be configured to deliver heat to other elements of the system (e.g., via the thermal control module), such as heat received from the input gas (e.g., received while cooling the input gas). For example, the dehumidifier can include one or more heat exchangers (and/or portions thereof, such as the hot side thereof, wherein the thermal control module and/or other elements of the system include the cold side that receive heat from the hot side) and/or any other suitable heat transfer elements.

However, the system can additionally or alternatively include any other suitable dehumidifiers.

3.6 Examples

In some examples, the system includes 4 (or more) capture modules. The 4 capture modules preferably share (e.g., receive inputs from and/or provide outputs to) a single dehumidifier and a single storage module. However, the system can additionally or alternatively include more than one dehumidifier and/or storage module.

Figure 1C:
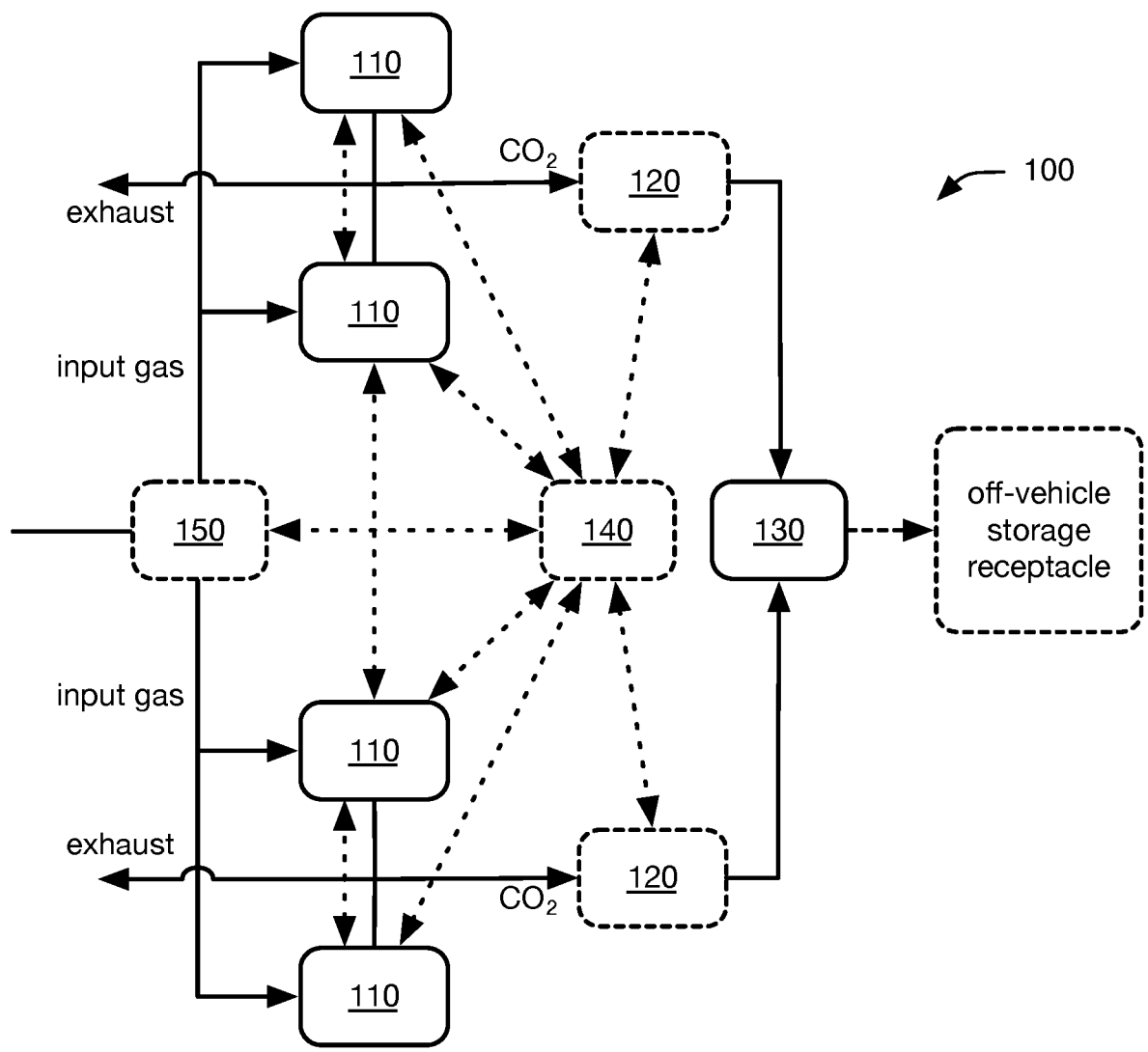

In a first such example, the capture modules are arranged in a parallel configuration (e.g., as shown in FIG. 1C). These capture modules can optionally be functionally grouped in pairs, wherein each pair functions (e.g., independently from the other pairs) to continuously accept and capture the target species from the input gas (e.g., wherein a first capture module of a pair operates in capture mode while the second operates in regeneration mode, and vice versa); however, they can additionally or alternatively have any other suitable functionality.

In a second such example, the capture modules are arranged in a parallel-series configuration. In this example, the capture modules are organized in groups (e.g., groups of two capture modules each), wherein the capture modules within a group are connected in series, and the groups are connected to each other in parallel. Accordingly, one group can operate in a capture mode while another operates in regeneration mode, and vice versa, thereby enabling continuous acceptance of and target species capture from the input gas.

Figure 8:
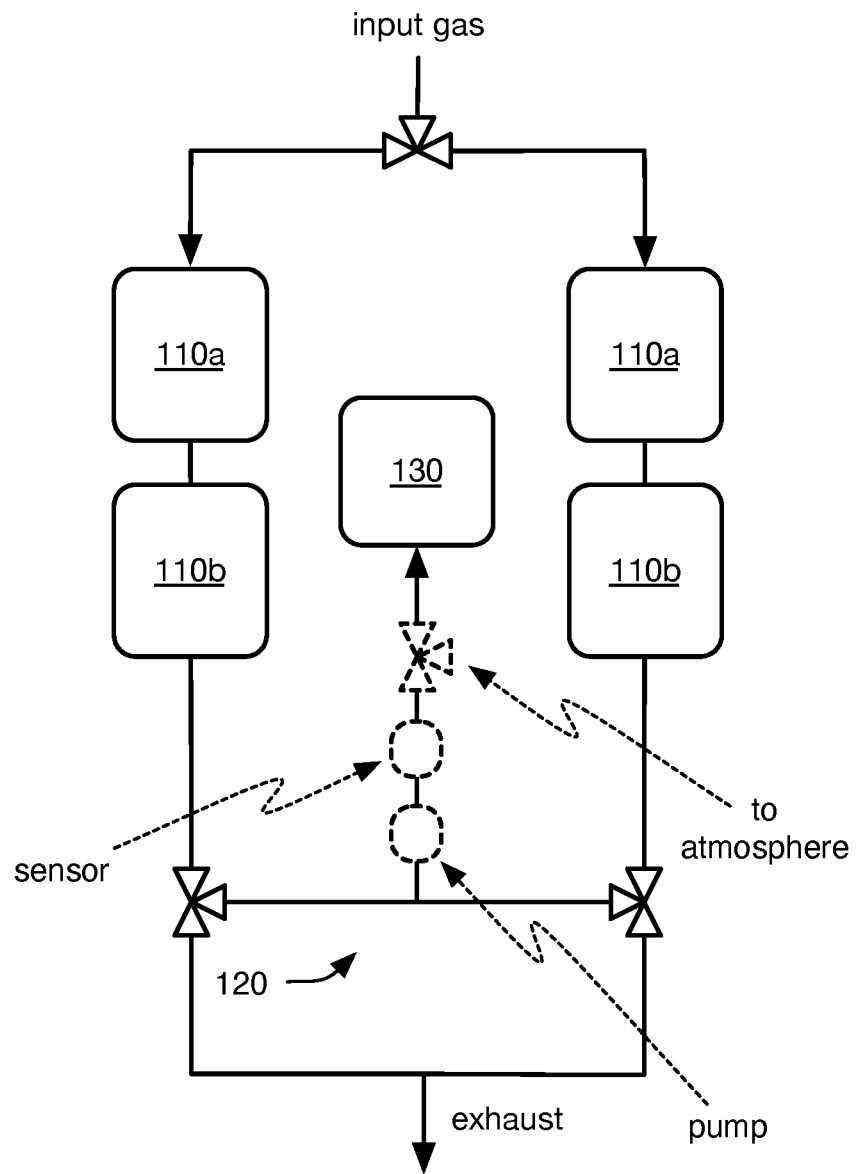
FIG. 8 is a schematic representation of a fifth example of a portion of the system.

In a specific example of this parallel-series configuration (e.g., as shown in FIG. 8), each group can include two capture modules, a first capture module 110a and a second capture module 110b. The first capture module of the group, which is upstream of the second capture module of the group, may receive the input gas at a high humidity. Accordingly, the first capture module 110a can function to dehumidify the input gas, and may be configured to do so (e.g., configured to capture water more effectively, possibly at the detriment of effectiveness at capturing the target species). Thus, the second capture module nob, which receives the dehumidified gas from the first capture module, can more effectively capture the target species, with less competition from water. Optionally, during regeneration, the first capture module can be heated to a greater temperature than the second capture module (e.g., wherein the first capture module is heated to less than 150 C, 150 C, 170 C, 180 C, 190 C, 200 C, 210 C, 220 C, 230 C, 240 C, 250 C, 260 C, 280 C, 300 C, 350 C, 400 C, 500 C, 600 C, 750 C, greater than 750 C, within any suitable open or closed interval bounded by any one or more of the aforementioned values, etc.), to enable effective desorption of the captured water from the first capture module. In some such examples, the desorbed species from the first capture module (e.g., primarily water) may be discarded (e.g., vented to atmosphere, condensed to harvest waste heat and then released from the system, etc.) while the desorbed species from the second capture module (e.g., primarily the target species, such as carbon dioxide) are stored.

However, the system can additionally or alternatively include any other suitable elements in any suitable arrangement.

4. Method

The method 200 preferably functions to capture one or more target species (e.g., carbon dioxide) from an input gas stream (e.g., combustion engine exhaust, such as diesel exhaust) that contains the target species. The method 200 is preferably performed concurrent with operation of a combustion engine, such as while a combustion engine-powered vehicle is driving (and/or otherwise operating its engine), but can additionally or alternatively be performed at any other suitable time.

The method preferably includes receiving the input gas stream (e.g., throughout performance of the method, concurrent with performing S210 and/or S220, etc.), such as from the combustion engine. For example, the method can include receiving volumes of the input gas (e.g., engine exhaust gas) over a period of time, wherein each such volume includes a respective portion of the target species (e.g., carbon dioxide).

4.1 Pre-Treating Input Gas

Figure 2B:
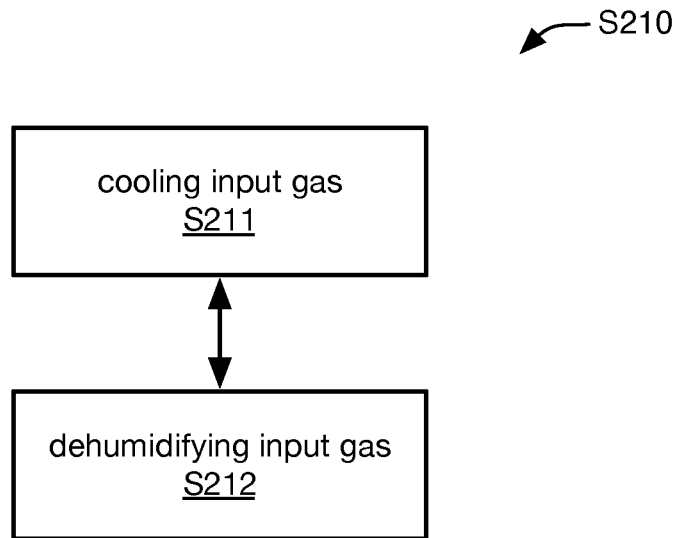
FIG. 2B is a schematic representation of an example of a first element of the method.

As received, many input gasses (e.g., combustion products such as diesel exhaust) typically contain water vapor and are typically at elevated temperature (e.g., greater than 50, 60, 70, 80, 90, 100, 40-60, 60-80, and/or 80-100° C., within any suitable open or closed interval bounded by any one or more of the aforementioned values, etc.). Pre-treating the input gas S210 can function to establish appropriate gas conditions (e.g., low humidity, temperature below a threshold temperature maximum, etc.) for efficient target species capture. In some examples, S210 can additionally or alternatively function to increase energy efficiency of the method, such as through waste heat capture and/or reuse. S210 can include cooling the input gas S211, dehumidifying the input gas S212, and/or performing any other suitable pre-treatments (e.g., as shown in FIG. 2B).

Cooling the input gas S211 preferably includes capturing waste heat from the input gas. The waste heat can be captured using one or more heat exchangers (e.g., as described above regarding the thermal control module 140) and/or in any other suitable manner. The captured waste heat can be used to heat other elements of the system (e.g., heating the capture medium and/or regeneration gas, preferably before and/or during performance of S230), can be used to heat other elements of the vehicle to which the system is connected (e.g., provide cabin heat, such as for driver comfort), and/or can be stored for later use (e.g., use as described above). Cooling the input gas can additionally or alternatively include rejecting waste heat (e.g., via heat rejection elements, such as radiators), actively cooling the input gas (e.g., as described below regarding dehumidifying S212, using any other suitable active cooling technique, etc.), and/or cooling the input gas in any other suitable manner.

S211 preferably includes cooling the input gas below a threshold maximum temperature (e.g., less than 0-50, 10-25, 20-40, 25-30, 30-35, 35-55, 50-100, 0, 10, 20, 25, 30, 35, 40, 50, 60, 80, and/or 100° C., within any suitable open or closed interval bounded by any one or more of the aforementioned values, etc.). In some examples, this target temperature maximum may change based on ambient conditions. For example, in low ambient temperature conditions, a lower target temperature maximum may be set, as this temperature maximum reduction may not pose a significant negative impact on the energy requirements of the method (due to increased ease of cooling the input gas in the colder ambient conditions), but may enable superior (e.g., faster, more complete, etc.) capture of the target species in S220; whereas in high ambient temperature conditions, a higher target temperature maximum may be set, as this temperature maximum increase may enable operation within an available energy budget (due to increased energy requirements for cooling the input gas in the hotter ambient conditions) while still allowing for adequate performance (e.g., adequate speed, capture efficiency, etc.) in capturing the target species in S220. However, S211 can additionally or alternatively include cooling the input gas in any other suitable manner.

Dehumidifying the input gas S212 is preferably performed using a dehumidifier (e.g., the dehumidifier 150 described above), such as a refrigeration module and/or a multi-stage dehumidification (or dehumidification and cooling) module. In some examples, the dehumidifier may cool the input gas while dehumidifying (e.g., using a refrigeration module). In some examples, S212 may include generating condensate (e.g., condensed water); such condensate is preferably rejected from the system, but can additionally or alternatively be stored and/or handled in any other suitable manner.

In one example, S210 includes capturing waste heat from the input gas (e.g., to be used for heating other elements of the system), thereby partially cooling the input gas, and then dehumidifying the input gas (e.g., by refrigerating the input gas to dehumidify it and cool it to below the threshold maximum temperature). However, S210 can additionally or alternatively include pre-treating the input gas in any other suitable manner.

4.2 Adsorbing Target Species

Adsorbing target species S220 probably functions to remove one or more target species (e.g., carbon dioxide) from the input gas. S220 preferably includes allowing the input gas (e.g., pre-treated input gas) to flow over the capture medium. For example, the input gas can be introduced (e.g., flowed into) the capture module, wherein the input gas preferably flows through the capture module and exits the system (e.g., then flowing to additional exhaust treatment elements of the vehicle to which the system is attached, venting to atmosphere, etc.).

S220 is preferably performed at substantially ambient pressure (e.g., approximately 1 atmosphere), such as when performed using a capture medium such as zeolite, activated carbon, and the like. Performing S220 at (or substantially at) ambient pressure can reduce energy requirements of the method, and/or can avoid potential safety concerns associated with operation at high pressures.

However, S220 can additionally or alternatively be performed at elevated pressure. In a first example, in which S220 is performed using a liquid capture medium, a pressure of up to 3 bar (e.g., 1.5-2 bar) or greater may be desired (e.g., to effectively push the input gas through the liquid capture medium). In a second example, in which S220 is performed using a MOF capture medium, S220 may be performed at significantly elevated pressures, such as pressures greater than 10 bar (e.g., 30-40 bar). However, S220 can additionally or alternatively be performed at lower pressures (e.g., partial vacuum) and/or at any other suitable pressures.

S220 is preferably performed at temperatures lower than a threshold maximum temperature (e.g., same or different from the target temperature maximum described above regarding S210), such as within a target capture temperature range (e.g., wherein the capture temperature range is bounded on the upper end by the threshold maximum temperature, and on the lower end by a target temperature minimum, such as −50, −30, −20, −10, 0, 10, 20, 25, 30, 35, −50--20, −20-0, 0-20, and/or 10-35° C.; wherein the capture temperature range is bounded by any two of the following values: −50, −30, −20, −10, 0, 10, 20, 25, 30, 35, 40, 50, 60, 80, and 100° C.; etc.). In examples, this threshold temperature can be associated with temperature of the input gas, of the capture medium, and/or of any other suitable elements of the system. Accordingly, in some embodiments, S220 can include cooling the capture medium (e.g., cooling from the elevated temperature achieved during S230). The capture medium is preferably passively cooled (more preferably, wherein the heat from the capture medium is captured in a manner analogous to that described above regarding S211), but can additionally or alternatively be actively cooled (e.g., using a refrigeration module) and/or cooled in any other suitable manner.

In some examples, S220 can optionally include monitoring the capture medium capacity. In such examples, the method preferably includes switching from adsorbing the target species S220 to desorbing the target species S230 in response to one or more triggers.

In a first example, one or more triggers can be based on a gas treatment metric, such as a concentration of carbon dioxide remaining in the treated gas (e.g., as indicated by a carbon dioxide sensor, such as an IR sensor, in the exiting gas stream and/or elsewhere in the system). For example, an increasing concentration of carbon dioxide and/or carbon dioxide concentration above a threshold value can be indicative of a partially or fully saturated capture medium, and can thus indicate an appropriate time to switch from adsorption to desorption.

In a second example, one or more triggers can be based on one or more metrics associated with the input gas and/or vehicle operation, such as amounts of: input gas treated (e.g., integrating input gas flow over time), engine fuel consumed, vehicle distance driven, time elapsed while performing S220, and/or any other suitable metrics. For example, the method can include performing S230 to regenerate a capture module in response to that capture module performing S220 for more than a threshold period of time (e.g., less than 3 minutes, 3, 4, 5, 6, 7, 8, 10, 12, 15, 20, 25, 30, 45, 60, 75, 90, 120, 150, 180, 240, or 300 minutes, more than 300 minutes, or any suitable value within any interval bounded by two of the aforementioned values) since its last regeneration. However, monitoring the capture medium capacity can additionally or alternatively be performed based on any other suitable triggers.

In some embodiments, S220 can include: receiving a volume of exhaust gas (e.g., from the dehumidifier and/or other pre-treatment elements, following S210; from a combustion engine; etc.); maintaining the exhaust gas, the capture medium, and/or any other suitable elements of the system below the target temperature maximum and/or within the capture temperature range; while maintaining this temperature state, passing a volume of exhaust gas through the capture module (e.g., through the housing that contains the capture medium) such that the capture medium adsorbs a portion of the carbon dioxide from the volume of exhaust gas, thereby depleting the volume of exhaust gas of (some or all) carbon dioxide and making it a $CO_2$-depleted volume of exhaust gas; and/or releasing this $CO_2$-depleted volume of exhaust gas (e.g., venting it to atmosphere). A person of skill in the art will recognize that the 'exhaust gas' described above could analogously be any other suitable input gas and/or the 'carbon dioxide' described above could analogously be any other suitable target species.

However, S220 can additionally or alternatively include adsorbing the target species in any other suitable manner and/or with any other suitable timing.

4.3 Desorbing Target Species

Desorbing the target species S230 preferably functions to regenerate the capture medium (e.g., for future performance of S220) and/or to segregate and store the target species.

S230 preferably includes heating the capture medium above a target temperature minimum (e.g., within a target regeneration temperature range), which can cause desorption of the adsorbed species. Heating the capture medium can include directly heating the capture medium, heating the regeneration gas (e.g., before and/or as it enters the capture module, within the capture module, etc.), and/or heating any other suitable elements of the system. The heating can be performed using captured waste heat (e.g., captured as described above regarding S211, captured from a combustion engine of the vehicle to which the system is attached, etc.), can include actively heating one or more elements (e.g., using resistive heaters, heat pumps, etc.), and/or can be performed in any other suitable manner.

In some examples (e.g., in which zeolite is used as the capture medium), the target temperature minimum is preferably greater than ambient temperature (e.g., 25, 30, 50, 70, 80, 90, 100, 105, 110, 115, 120, 125, 130, 135, 140, 150, 170, 180, 190, 200, 210, 220, 230, 240, 250, 260, 280, 300, 350, 400, 500, or greater than 500° C., 20-50, 50-80, 80-150, 80-110, 100-135, 110-150, 150-200, 200-250, 250-300, 300-400, 400-500, and/or greater than 500° C., etc.). In some such examples, the target regeneration temperature range may be bounded on the lower end by the target temperature minimum, and bounded on the upper end by 50, 70, 80, 90, 100, 120, 150, 170, 180, 190, 200, 210, 220, 230, 240, 250, 260, 280, 300, 350, 400, 500, 600, 700, 800, or greater than 800° C.; and/or can be any suitable open or closed interval bounded by any one or more of the aforementioned values. However, in other examples (e.g., in which capture media such as MOFs and/or activated carbon are used), the target temperature minimum may be higher.

The temperature difference between the target temperature maximum of S220 and the target temperature minimum of S230 is preferably minimized, subject to the constraint that such minimization does not significantly reduce the adsorption and/or desorption performance of the system. Such temperature difference minimization can function to reduce the energy required to perform the method (e.g., energy required to heat the capture medium and/or regeneration fluid for each transition from adsorption to desorption, energy required to cool the capture medium and/or input fluid for each transition from desorption to adsorption, etc.). In some examples, the target temperature minimum may change based on ambient conditions. For example, in high temperature ambient conditions, a higher target temperature minimum may be used, as heating to this increased temperature minimum may not result in a significant negative impact on energy requirements (e.g., due to increased ease of heating the elements in the elevated ambient temperature). However, S230 can additionally or alternatively be performed at any other suitable temperature.

In some embodiments, S230 is performed at substantially ambient pressure, which can function to reduce energy requirements and/or avoid complexities associated with using vacuum and/or pressure vessels.

In some embodiments, S230 includes flowing a regeneration gas through the capture medium. The regeneration gas can function to purge the desorbing target species from the capture module. The regeneration gas preferably consists essentially of the target species, which can prevent dilution of the desorbed species with other species. However, S230 can additionally or alternatively include using any other suitable regeneration fluids (e.g., as described above regarding the regeneration module 120). The regeneration gas is preferably flowed in a loop through the capture module and regeneration module. The regeneration gas can flow through the capture module in the same direction as input gas flows during S220, can flow in the opposite direction, can flow through one or more different ports than the input gas does, and/or can have any other suitable flow path.

Additionally or alternatively, S230 can be performed at lower pressure (e.g., partial vacuum pressure), which can function to increase desorption performance (e.g., increase desorption rate, increase total amount of species desorbed, etc.). For example, S230 can be performed by reducing the pressure within the capture module (e.g., within the interior of the housing, at the capture medium), such as by pumping gas out of the capture module (e.g., into the regeneration manifold).

However, S230 can additionally or alternatively be performed at elevated pressure and/or any other suitable pressure.

Figure 6A:
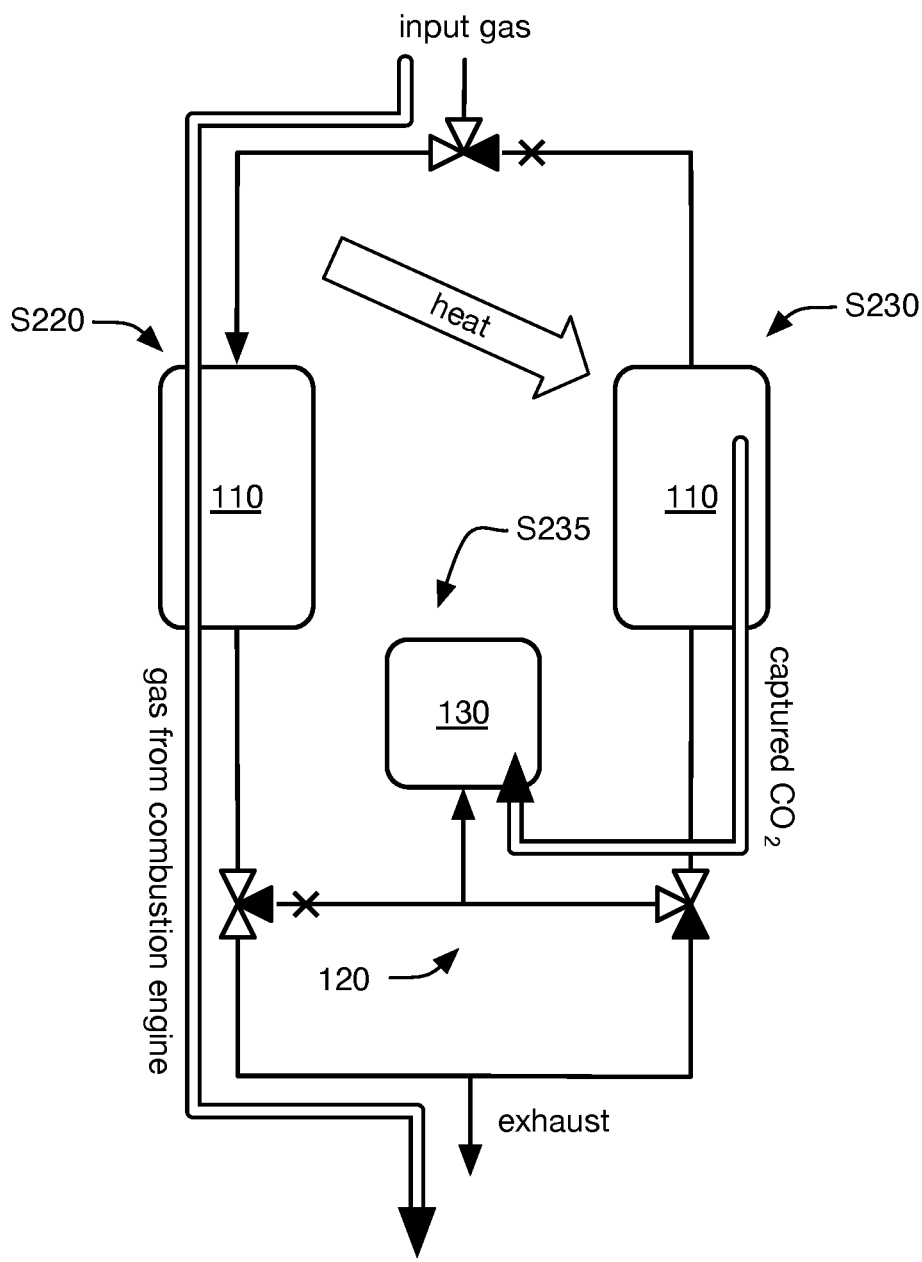
FIGS. 6A-6B are schematic representations of gas flow through an example of the system in a first and second operation mode, respectively.
Figure 6B:
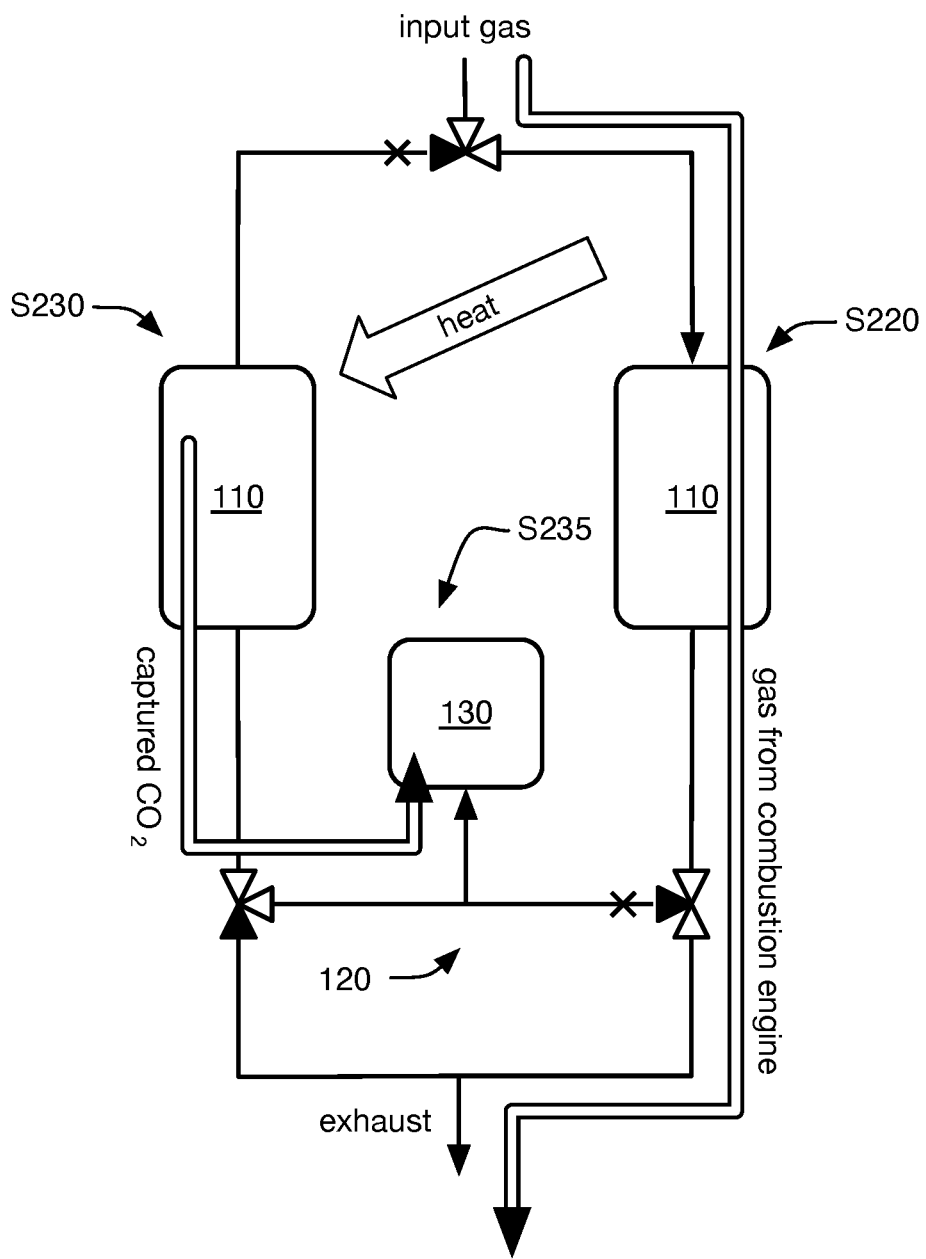
Figure 7:
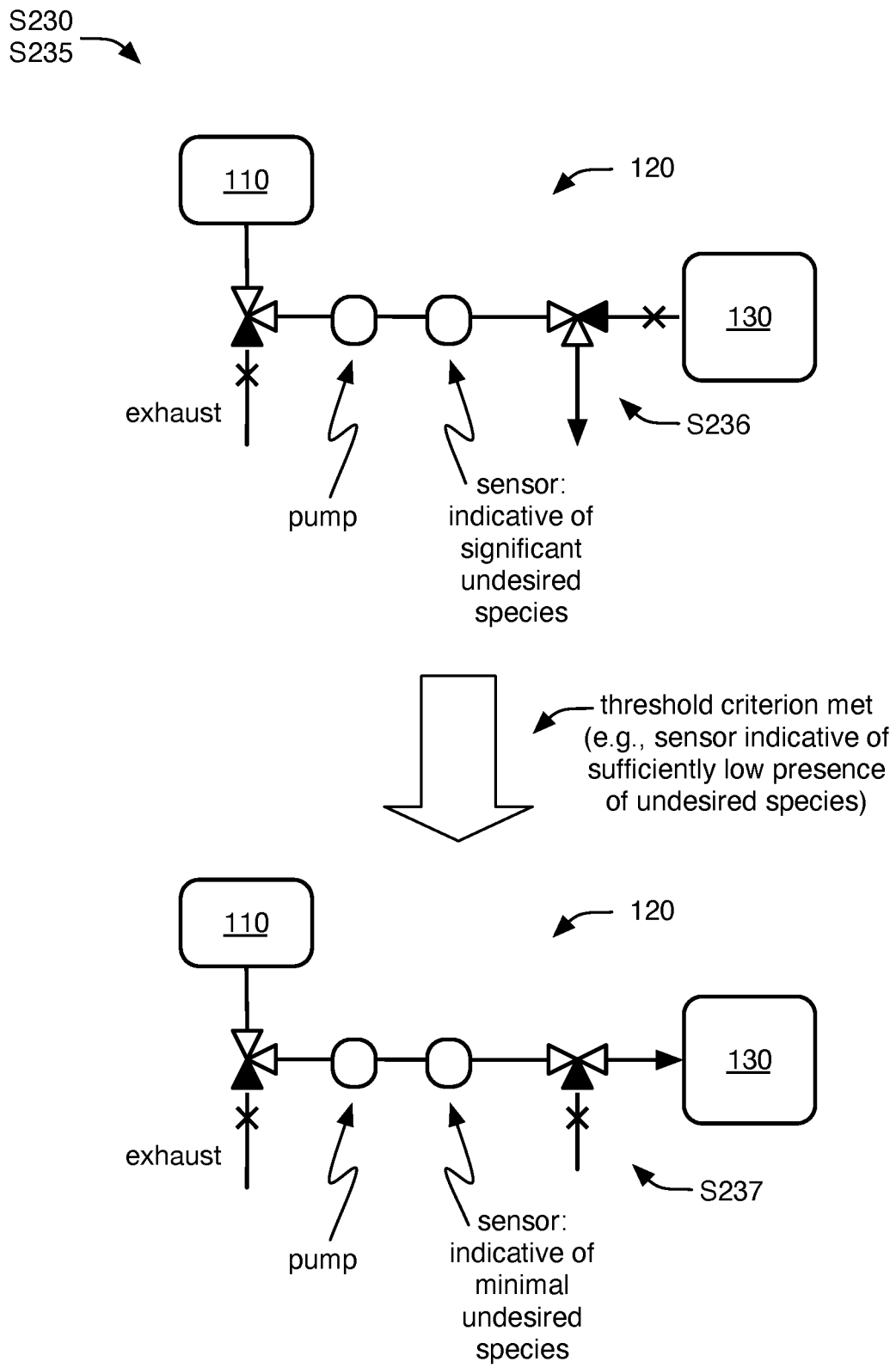
FIG. 7 is a schematic representation of an example of transitioning from a vent mode to a storage mode.

In some examples, the method can include switching a capture module from desorbing the target species S230 to adsorbing the target species S220 in response to another capture module (e.g., the other capture module of a pair, such as described above in more detail regarding the system) switching from adsorbing to desorbing. Accordingly, the input gas stream can be redirected from one capture module to the other, and the target species can continue to be captured from the input gas stream (e.g., without or substantially without interruption), such as shown by way of example in FIGS. 6A-6B.

In other examples, S230 can optionally include monitoring the desorption progress. In such examples, the method preferably includes switching from desorbing the target species S230 to adsorbing the target species S220 in response to one or more triggers.

In a first example, one or more triggers can be based on a gas treatment metric, such as a rate of carbon dioxide (and/or total gas) desorption and/or flow (e.g., as indicated by a carbon dioxide sensor, such as an IR sensor, a pressure sensor, a flow sensor, pump/compressor metrics such as pump speed and/or power consumption, and/or any other suitable sensor, any of which may be located in the regeneration manifold, capture module, and/or elsewhere in the system). For example, a decreasing rate and/or a rate below a threshold value can be indicative of a partially or fully regenerated capture medium, and can thus indicate an appropriate time to switch from desorption to adsorption.

In a second example, one or more triggers can be based on time elapsed while performing S230. For example, the method can include performing S220 to resume using a capture module for target species capture in response to that capture module having performed S230 for more than a threshold period of time (e.g., less than 3 minutes, 3, 4, 5, 6, 7, 8, 10, 12, 15, 20, 25, 30, 45, 60, 75, 90, 120, 150, 180, 240, or 300 minutes, more than 300 minutes, or any suitable value within any interval bounded by two of the aforementioned values) since it was last used for target species capture. In a first specific example, the threshold period of time is fixed. In a second specific example, the threshold period of time is determined based on one or more metrics indicative of the quantity of target species adsorbed by the capture module in the previous performance of S220, such as amounts of: input gas treated (e.g., integrating input gas flow over time), engine fuel consumed, vehicle distance driven, time elapsed while performing S220, and/or any other suitable metrics. However, monitoring the desorption progress can additionally or alternatively be performed based on any other suitable triggers.

In some embodiments, S230 can include transferring heat (e.g., from a volume of exhaust gas, such as a volume received in S210) to the capture medium, such that the capture medium (and/or any other suitable elements of the system) exceeds (e.g., and remains above) the capture temperature range and/or the regeneration temperature minimum, and/or remains within the regeneration temperature range, thereby causing the portion of the target species (e.g., carbon dioxide) that was adsorbed by the capture medium in S220 to desorb. In such embodiments, S235 (described below in more detail) preferably includes storing this portion of the target species (e.g., at the storage module).

Further, S230 can additionally or alternatively include desorbing the target species in any other suitable manner.

4.4 Storing the Target Species

The method preferably includes storing the desorbed target species S235 (e.g., during performance of S230). The desorbed target species is preferably directed out of the regeneration manifold into the storage module. The target species can be directed out of the regeneration manifold using one or more pumps, compressors, and/or any other suitable elements. Additionally or alternatively, the target species can passively exit the regeneration manifold (e.g., through a valve, such as a check valve) and/or can enter the storage module in any other suitable manner. The target species is preferably stored in a densified form (e.g., as described above regarding the storage module 130), but can additionally or alternatively be stored in any other suitable form.

Figure 2C:
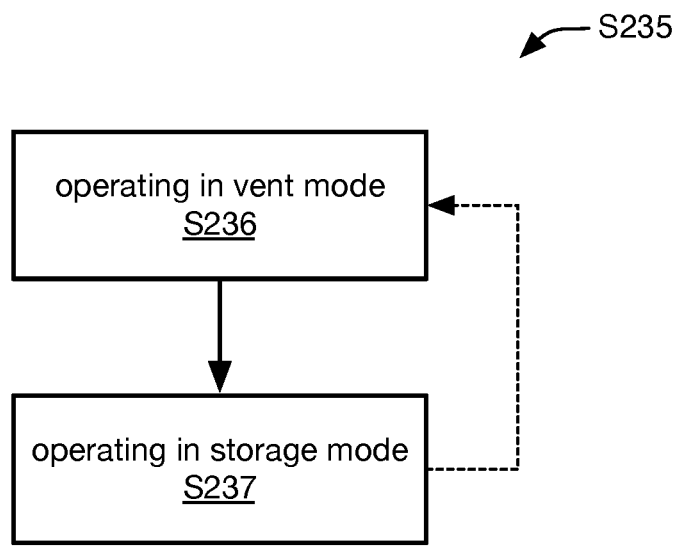
FIG. 2C is a schematic representation of an example of a second element of the method.

In some embodiments, S235 includes operating in a vent mode S236 and operating in a storage mode S237 (e.g., as described above regarding the regeneration module 120), preferably transitioning from the vent mode to the storage mode but additionally or alternatively operating in these modes with any other suitable timing (e.g., as shown in FIG. 2C). In the vent mode, the gas in the regeneration manifold (e.g., gas evacuated from the capture module, such as gas desorbed from the capture medium and/or uncaptured gas from within voids in the capture module) is preferably released (e.g., vented to atmosphere) or otherwise disposed of. In the storage mode, the gas in the regeneration manifold is preferably conveyed into the storage module (e.g., as described above). Regenerating a capture module preferably begins while operating in the vent mode, and switches operation to the storage mode during regeneration of the capture module; however, operation in these modes can be performed with any other suitable timing.

In some such embodiments, operation can be switched between the vent mode and the storage mode based on the composition of the gas in the regeneration manifold (and/or elsewhere in the system, such as in the capture module being regenerated). For example, operation can be switched based on information sampled by one or more composition sensors, such as carbon dioxide sensors, oxygen sensors, and the like (e.g., as described above regarding the regeneration module). For example, operation can switch from the vent mode to the storage mode in response to the target species (e.g., carbon dioxide) fraction exceeding a threshold minimum value (e.g., less than 50%, 50%, 60%, 65%, 70%, 75%, 80%, 85%, 90%, 93%, 95%, 96%, 97%, 98%, 99%, greater than 99%, or any suitable value within an interval bounded by any two of the aforementioned values) and/or in response to the contaminant fraction (e.g., of a specific undesired species or set of species, such as oxygen; of all undesired species; etc.) falling below a threshold maximum value (e.g., more than 50%, 50%, 40%, 35%, 30%, 25%, 20%, 15%, 12%, 10%, 9%, 8%, 7%, 6%, 5%, 4%, 3%, 2%, 1%, 0.5%, 0.2%, less than 0.2%, or any suitable value within an interval bounded by any two of the aforementioned values). In specific examples, the threshold minimum value for the carbon dioxide fraction can be in the range 70-80% (e.g., 75%) and/or the threshold maximum value for the oxygen fraction can be in the range 7-15% (e.g., 10%). In one embodiment, S235 can include switching from the vent mode to the storage mode when the threshold criterion (or criteria) is met (e.g., target species fraction exceeds the threshold minimum value and/or contaminant fraction is less than the threshold maximum value, such as momentarily or for more than a threshold period of time, such as less than is, 1 s, 2 s, 5 s, 10 s, 20 s, 30 s, 60 s, 120 s, more than 120 s, or any suitable value within an interval bounded by any two of the aforementioned values, etc.), but not switching back to the vent mode during the regeneration of a particular capture module. In another embodiment, S235 can include switching between the vent mode and storage mode (e.g., back and forth between the two) based on the threshold criterion (or criteria).

Additionally or alternatively, operation can be switched between the vent mode and the storage mode based on the pressure of the gas in the regeneration manifold (and/or elsewhere in the system, such as in the capture module being regenerated). For example, the pressure may be elevated (e.g., closer to ambient pressure) at the beginning of capture module regeneration, and may decrease (e.g., approaching a target vacuum level, such as less than 20, 20, 25, 26, 27, 28, 29, 29.5, 29.7, 29.8, greater than 29.8 inHg, or any suitable value within an interval bounded by any two of the aforementioned values) as regeneration proceeds (e.g., as the voids in the capture module are substantially evacuated). Accordingly, the operation can be switched to the storage mode once the pressure drops below a threshold value (e.g., less than 5, 5, 10, 15, 18, 20, 22, 23, 24, 25, 26, 27, 28, 29, 29.5, 29.7, 29.8, greater than 29.8 inHg, or any suitable value within an interval bounded by any two of the aforementioned values). In some variants, metrics associated with pumps, valves, and/or any other suitable elements of the system can be used as proxies for pressure measurements; for example, pump speed and/or power draw can be used a proxies for pressure at the pump (e.g., pump inlet and/or outlet), and so operation can be switched based on a threshold pump speed value and/or threshold pump power draw value, in an analogous manner to that described above regarding the pressure.

Additionally or alternatively, operation can be switched between the vent mode and the storage mode based on timing considerations. For example, operation can be switched from vent mode to storage mode after a threshold amount of time (e.g., less than is, 1 s, 2 s, 5 s, 10 s, 20 s, 30 s, 60 s, 120 s, more than 120 s, or any suitable value within an interval bounded by any two of the aforementioned values, etc.) has elapsed.

In some embodiments, S235 can include densifying and/or purifying the target species stored in the storage module. For example, carbon dioxide (and other residual species) can be compressed (e.g., above the critical point pressure of approximately 1100 psi and/or above any other suitable threshold pressure) and cooled (e.g., passively cooled, such as cooled approximately to ambient temperatures; actively cooled, such as cooled by a heat exchanger that preferably transports its heat to other elements of the system, such as to a capture module undergoing regeneration, and/or by a refrigeration system, etc.; cooled below the critical point temperature of approximately 31° C. and/or below any other suitable threshold temperature) such that the carbon dioxide transitions to a condensed phase (e.g., liquid). Once (some or all of) the target species has transitioned to one or more condensed phases, the storage module can be purged and/or vented to remove undesired gaseous species (e.g., as described above in more detail regarding the storage module).

However, the target species can additionally or alternatively be stored in any other suitable manner.

4.5 Offloading Stored Species

The method 200 can optionally include offloading the stored species S240, which can function to transfer the captured species from the storage module to an external receptacle. For example, S240 can include connecting the storage module to an off-vehicle storage receptacle and transferring the stored species via this connection (and preferably disconnecting the storage module from the off-vehicle storage receptacle after the transfer is complete). S240 is preferably performed while the vehicle is substantially not in motion (e.g., is parked at an offload location), but can additionally or alternatively be performed at any other suitable time. S240 can be performed while the vehicle engine is off, and/or while the engine is on (and preferably, while the target species continues to be captured from the engine exhaust), and/or in any other suitable vehicle state.

In a first example, the captured species is allowed to flow from the storage module to the off-vehicle receptacle (e.g., compressed gas flowing from high pressure within the storage module to lower pressure within the off-vehicle storage receptacle, liquid flowing downward with respect to gravity into the off-vehicle storage module, etc.). In a second example, the stored species is pumped from the storage module to the off-vehicle storage receptacle.

However, S240 can additionally or alternatively include offloading the stored species in any other suitable manner.

4.5 Regenerating Desiccators

The method 200 can optionally include regenerating one or more desiccators S250, which can function to release (and preferably discard) water captured by the desiccators. The desiccators can include desiccators (and/or other water capture elements) of the dehumidifier, one or more capture modules (e.g., first capture modules of systems include capture modules in a parallel-series arrangement, all capture modules, any other suitable set of capture modules), and/or any other suitable elements. By releasing the captured water, S250 can restore desiccator capacity for accepting more water; additionally or alternatively, S250 can restore capacity for capturing other species, such as carbon dioxide (and/or other target species) for a capture module that has captured water. However, S250 can additionally or alternatively be performed to regenerate any other suitable water-capture elements.

S250 is preferably performed while the vehicle is substantially not in motion (e.g., is parked at an offload location), but can additionally or alternatively be performed at any other suitable time. S250 can be performed while the vehicle engine is off, and/or while the engine is on (and preferably, while the target species continues to be captured from the engine exhaust), and/or in any other suitable vehicle state. S250 can be performed concurrently with S240 and/or at separate times from S240.

S250 preferably includes heating the desiccators to be regenerated to an elevated temperature (e.g., less than 150 C, 150 C, 170 C, 180 C, 190 C, 200 C, 210 C, 220 C, 230 C, 240 C, 250 C, 260 C, 280 C, 300 C, 350 C, 400 C, 500 C, 600 C, 750 C, greater than 750 C, within any suitable open or closed interval bounded by any one or more of the aforementioned values, etc.), which can cause water to desorb (and/or otherwise be released) from the desiccator. Power for heating the desiccator(s) is preferably provided by an external power source (e.g., provided to the system at a regeneration or offload/regeneration facility), but can additionally or alternatively be provided by a vehicle-based power source (e.g., the combustion engine) and/or any other suitable power source(s).

In some examples, heat from the released water can be captured (e.g., to be used as described above regarding other heat sources, such as to heat the capture media during regeneration in S230.

However, S250 can additionally or alternatively include regenerating one or more desiccators in any other suitable manner.

4.6 Additional Considerations

The method 200 preferably includes performing S220 at all times (or substantially all times) at which input gas is being generated (e.g., the combustion engine is running), and/or whenever input gas is otherwise available for use by the system. Accordingly, during such times, at least one capture module of the system preferably performs S220 (e.g., accepting input gas and capturing the target species from it).

In one example, in which the system includes at least two capture modules, the capture modules can switch between performing S220 and S230, such that (during periods when the input gas is being generated) at least one is always performing S220. For example, a subset (e.g., half, approximately half, between 20% and 80%, etc.) of the storage modules can perform S220 while the remainder (e.g., the other half) perform S230. In a specific example, one capture module may switch from S220 to S230 (e.g., as described above regarding monitoring capture medium capacity), and another capture module preferably switches from S230 to S220 at substantially the same time (but can alternatively switch before, after, and/or at any other suitable time).

However, the elements of the method 200 can additionally or alternatively be performed with any other suitable timing.

Although described herein as process gasses (e.g., input gas, regeneration gas, desorbed gas, gas evacuated from the capture module, etc.), a person of skill in the art will recognize that any other suitable fluids (e.g., liquids, supercritical fluids, etc.) can analogously be used (e.g., in and/or with the system and/or method described herein) in place of some or all of these process gasses. Accordingly, any reference herein to a process gas can be understood to enable the use of analogous process fluids (e.g., input fluid, regeneration fluid, etc.) of any other suitable state (e.g., wherein system elements, such as valves, pumps, and the like, are selected and/or configured for use with process fluids of the appropriate type(s)).

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method, comprising:
    passing a volume of exhaust gas through a housing of a capture module such that a capture medium, which is maintained below a threshold temperature, adsorbs a portion of a target species from the volume of exhaust gas;
    applying heat to the capture medium such that the capture medium exceeds the threshold temperature and the portion of the target species desorbs from the capture medium;
    while the capture medium exceeds the threshold temperature, urging gasses from the housing into a regeneration manifold fluidly coupled to the housing;
    after the portion of the target species desorbs, storing at least a subset of the portion of the target species in a storage module, comprising, while urging the gasses from the housing into the regeneration manifold:
        at the regeneration manifold, receiving the gasses;
        at the regeneration manifold, while receiving the gasses, venting an initial volume of the gasses; and
        in response to a trigger condition being met and after venting the initial volume of the gasses, operating the regeneration manifold to stop venting, and
    wherein, after the regeneration manifold stops venting, an additional volume of the gasses is received at the regeneration manifold and evacuated to the storage module, the additional volume comprising the subset of the portion of the target species.

2. The method of claim 1, wherein the trigger condition is based on an elapsed time the portion of the target species is adsorbed by the capture medium.

3. The method of claim 1, wherein the trigger condition is based on an elapsed time the portion of the target species is desorbed from the capture medium.

4. The method of claim 1, wherein the trigger condition is based on one or more metrics associated with vehicle operation of a vehicle from which the volume of exhaust gas is received.

5. The method of claim 1, wherein the trigger condition is based on a composition of the gasses in the capture module.

6. The method of claim 1, wherein the trigger condition is based on a target species fraction exceeding a threshold minimum value for more than a threshold period of time.

7. The method of claim 1, wherein the trigger condition is based on an undesired species fraction falling below a threshold maximum value for more than a threshold period of time.

8. The method of claim 1, wherein the trigger condition is based on a pressure of the gasses in the regeneration manifold and/or the capture module dropping below a threshold value.

9. The method of claim 8, wherein the pressure of the gasses is indicated by a pump speed and/or a pump power draw of a pump arranged along the regeneration manifold.

10. The method of claim 1, wherein venting, at the regeneration manifold and while receiving the gasses, the initial volume of the gasses comprises venting, at the regeneration manifold and while receiving the gasses, the initial volume of the gasses to atmosphere.

11. The method of claim 1, wherein venting, at the regeneration manifold and while receiving the gasses, the initial volume of the gasses comprises venting, at the regeneration manifold and while receiving the gasses, the initial volume of the gasses to a second capture module.

12. The method of claim 1, wherein venting the initial volume of the gasses at the regeneration manifold and while receiving the gasses further comprises venting the initial volume of the gasses at the regeneration manifold and while receiving the gasses back to the capture module.

13. The method of claim 1, wherein the capture medium is water-resistant.

* * * * *